US 6,582,739 B1

(12) United States Patent
Sawano et al.

(10) Patent No.: US 6,582,739 B1
(45) Date of Patent: Jun. 24, 2003

(54) PROCESSES FOR PRODUCING FUNCTIONAL OKARA MILKS AND FUNCTIONAL TOFUS

(75) Inventors: Etsuo Sawano, Yamaguchi (JP); Hiroshi Sawano, Yamaguchi (JP)

(73) Assignee: Sawa Industrial Co., Ltd., Yamaguchi (JP)

( * ) Notice: Subject to any disclaimer, the term of this patent is extended or adjusted under 35 U.S.C. 154(b) by 0 days.

(21) Appl. No.: 09/622,407

(22) PCT Filed: Feb. 22, 1999

(86) PCT No.: PCT/JP99/00756
§ 371 (c)(1),
(2), (4) Date: Aug. 17, 2000

(87) PCT Pub. No.: WO99/41999
PCT Pub. Date: Aug. 26, 1999

(30) Foreign Application Priority Data

Feb. 20, 1998 (JP) ............................................. 10-039316

(51) Int. Cl.⁷ ................................................ A23L 1/20

(52) U.S. Cl. ............................ 426/46; 426/52; 426/634; 426/442; 426/598

(58) Field of Search ........................... 426/634, 46, 52, 426/442, 598

(56) References Cited

FOREIGN PATENT DOCUMENTS

| GB | 1465396 | * | 2/1977 |
| JP | 06-287554 | * | 11/1994 |
| JP | 08-308520 | * | 11/1996 |
| JP | 09-070274 | * | 3/1997 |

* cited by examiner

Primary Examiner—Anthony J. Weier
(74) Attorney, Agent, or Firm—Kanesaka & Takeuchi

(57) ABSTRACT

According to the present invention, soybean curd lees are effectively utilized, which are discharged in large quantity in the process-to produce soybean-related food products such as soybean curd (tofu), soybean milk, etc. known as superb food products containing vegetable proteins. The soybean milk (functional soybean curd lees milk) and soybean curd (functional soybean curd) both having good taste and high functions can be produced without discharging waste product and with high economic feasibility.

22 Claims, 8 Drawing Sheets

Boiled "go" mode

Raw "go" mode

PROCESSES FOR PRODUCING FUNCTIONAL OKARA MILKS AND FUNCTIONAL TOFUS

FIELD OF THE INVENTION

The present invention relates to an effective utilization of soybean curd lees, which are discharged in large quantity in the process to produce soybean foods such as soybean curd (tofu) or soybean milk known as superior foodstuffs containing vegetable protein. In particular, the invention relates to a method for producing tasty and highly functional soybean milk and soybean curd (tofu) using at least a part of soybean curd lees with high economic feasibility and without releasing wastes.

BACKGROUND ART

In a conventional process to produce soybean-related food products such as soybean curd, soybean milk, etc., a large quantity of soybean curd lees are discharged as side products.

The disposal of the soybean curd lees causes serious environmental and economic problems, and various attempts have been made to effectively utilize the soybean curd lees for different purposes.

An invention is described (for example, in JP-A-5-3761) to utilize the soybean curd lees as raw material for soybean curd without discarding as waste. However, according to this invention, the production process is complicated and the number of processes are too many. It is necessary to perform refrigerating process for preservation and thawing process, and this requires long time and high cost.

There are many different methods to produce soybean curd, such as a method based on enzyme processing, based on pulverizing process, a method using these two methods, etc. However, the obtained products are of lower quality and poor in taste, flavor when eaten, odor, color and luster, and visco-elasticity. It is very difficult to propagate and market these products on practical scale and on commercial base.

Further, various proposals have been made in many different fields on the utilization of soybean curd lees, but most of them are not suitable for practical application.

DISCLOSURE OF THE INVENTION

After making every possible effort to overcome the above problems, the present inventors have developed a method for producing a functional soybean curd lees milk and a functional soybean curd useful for keeping good health by effectively utilizing soybean curd lees, which are obtained in large quantity as side product during the process to produce soybean curd. The newly developed method is described in the present invention.

Specifically, the present invention relates to the production of a functional soybean curd lees milk as described below, and also to the production of a functional soybean curd.

In the present invention, the term "whole soybean" means soybean with shell in full size. The term "shelled soybean" means a soybean obtained from the whole soybean by removing shell and hypocotyls. The term "powdered soybean" means a soybean product obtained by pulverizing the above soybean.

The term "functional soybean curd lees milk" means a type of soybean milk, which is obtained from raw material containing soybean curd lees by enzyme reaction while applying mechanical pulverizing process in liquid. The term "functional total soybean curd lees milk" means a product produced by adding soybean milk, obtained in a process to produce soybean-related food product, to the functional soybean curd lees milk. Further, the term "functional soybean curd" means a type of soybean curd, which is produced using the above functional soybean curd lees milk.

Further, the term "primary enzyme reaction" used in the embodiments of the present invention means enzyme reaction by a plant tissue disintegrating enzyme. The term "secondary enzyme reaction" means enzyme reaction by a protein crosslinking enzyme.

[The Inventions Relating to the Production of Functional Soybean Curd Lees Milk]

(1) A method for producing a functional soybean curd lees milk, comprising the steps of adding water and a plant tissue disintegrating enzyme to soybean curd lees produced in a process to produce soybean products such as soybean milk and soybean curd, performing enzyme reaction while applying mechanical pulverizing process in liquid, and producing a functional soybean curd less milk containing large quantity of food fibers.

(2) A method for producing a functional soybean curd lees milk, comprising the steps of adding water and a plant tissue disintegrating enzyme to soybean curd lees produced in a process to produce soybean products such as soybean milk and soybean curd, performing enzyme reaction while applying mechanical pulverizing process in liquid, performing enzyme reaction by adding protein crosslinking enzyme, and producing functional soybean curd lees milk containing large quantity of food fibers.

(3) A method for producing a functional soybean curd lees milk, comprising the steps of adding water, a plant tissue disintegrating enzyme, and a protein decomposing enzyme to soybean curd lees formed in a process to produce soybean-related food products such as soybean milk or soybean curd, performing enzyme reaction by adding mechanical pulverizing process in liquid, and producing a functional soybean curd lees milk containing large quantity of food fibers.

(4) A method for producing a functional soybean curd lees milk, comprising the steps of adding water, a plant tissue disintegrating enzyme, and a protein decomposing enzyme to soybean curd lees formed in a process to produce soybean-related food products such as soybean milk or soybean curd, performing enzyme reaction by adding mechanical pulverizing process in liquid, performing enzyme reaction by adding a protein crosslinking enzyme, and producing a functional soybean curd lees milk containing large quantity of food fibers.

(5) A method for producing a functional soybean curd lees milk, comprising the steps of adding water and a plant tissue disintegrating enzyme to soybean curd lees produced in a process to produce soybean products such as soybean milk and soybean curd, performing enzyme reaction while applying mechanical pulverizing process in liquid, performing enzyme reaction by adding soybean milk formed in a process to produce the soybean-related food products and mixing with a protein crosslinking enzyme, and producing a functional total soybean curd lees milk containing large quantity of food fibers.

(6) A method for producing a functional soybean curd lees milk, comprising the steps of adding water and a plant tissue disintegrating enzyme to soybean curd lees produced in a process to produce soybean products such as soybean milk and soybean curd, performing enzyme reaction while applying mechanical pulverizing process in liquid, performing enzyme reaction by adding a protein crosslinking enzyme, adding and mixing soybean milk formed in the process to produce said soybean-related food product, and producing a functional total soybean curd lees milk containing large quantity of food fibers.

(7) A method for producing a functional soybean curd lees milk, comprising the steps of performing water-immersion process, smashing process and heating process on soybeans one after another to obtain a boiled "go" (water-immersed and smashed soybeans), and performing enzyme reaction according to one of (1) to (4) above to said boiled "go".

(8) A method for producing a functional soybean curd lees milk, comprising the steps of obtaining a "go" juice (raw "go") through immersion process and smashing process on soybeans, performing enzyme reaction according to one of (1) to (4) above, and heating and cooling.

(9) A method for producing a functional soybean curd less milk according to one of (1) to (8) above, wherein the enzyme reaction is characterized in that:

① adding quantity of the plant tissue disintegrating enzyme is 0.1–1.0 weight %, reaction temperature is 20° C.–60° C., and reaction time is 30–90 minutes; and ② adding quantity of the protein crosslinking enzyme is 0.1–2.0 weight %, enzyme reaction temperature is 20° C.–50° C., and enzyme reaction time is 70–10 minutes.

(10) A method for producing a functional soybean curd lees milk according to one of (1) to (9) above, wherein the soybean curd lees are pulverized to particle size of less than 100 μm by mechanical pulverizing process.

(11) A method for producing a functional soybean curd lees milk according to (10) above, wherein said mechanical pulverizing process is performed using a colloid mill.

(12) A method for producing a functional soybean curd lees milk according to (2) and (4) to (11) above, wherein the protein crosslinking enzyme is transglutaminase.

(13) A method for producing a functional soybean curd lees milk according to one of (1) to (12) above, wherein the plant tissue disintegrating enzyme is an enzyme to decompose and dissolve one or more types selected from pectin, protopectin, hemicellulose or cellulose to low molecular substances.

(14) An apparatus for producing a functional soybean curd lees milk, comprising a raw material fluid tank for accommodating a raw material mixture containing soybean curd lees, water and various types of enzymes as described in one of (1) to (13) above, and an in-liquid pulverizer for pulverizing the soybean curd lees to particle size of less than 100 μm, whereby said in-liquid pulverizer is designed in such a structure that pulverizing processing of the soybean curd lees and enzyme reaction are performed at the same time.

(15) An apparatus for producing a functional soybean curd lees milk, comprising a raw material fluid tank for accommodating a raw material mixture containing soybean curd lees, water, various types of enzymes and soybean milk as described in one of (1) to (13) above, and an in-liquid pulverizer for pulverizing the soybean curd lees to particle size of less than 100 μm, whereby said in-liquid pulverizing is designed in such a structure that pulverizing processing of the soybean curd lees and enzyme reaction are performed at the same time.

(16) An apparatus for producing a functional soybean curd lees milk according to (14) or (15) above, wherein said in-liquid pulverizer is a colloid mill installed and connected to an outlet of the raw material fluid tank.

Further, other aspects of the present invention are proposed as follows:

(17) A method for producing a functional soybean curd lees milk, comprising the steps of performing water-immersion process, smashing process and heating process one after another to soybeans to produce a boiled "go" (water-immersed and smashed soybeans), and performing enzyme reaction described in one of (1) to (4) above to the boiled "go".

Specifically, the method comprises the steps of:

① performing enzyme reaction by adding a plant tissue disintegrating enzyme to the boiled "go" and performing enzyme reaction by applying mechanical pulverizing on it in liquid; ② adding a plant tissue disintegrating enzyme, and performing enzyme reaction while applying mechanical pulverizing to it in liquid, and then, adding a protein crosslinking enzyme and performing enzyme reaction; ③ adding a plant tissue disintegrating enzyme and a protein decomposing enzyme, and performing enzyme reaction while applying mechanical pulverizing process in liquid; ④ adding a plant tissue disintegrating enzyme and a protein decomposing enzyme, and performing enzyme reaction while applying mechanical pulverizing process in liquid, and then, performing enzyme reaction by adding the protein crosslinking enzyme.

(18) A method for producing a functional soybean curd lees milk according to (17) above, wherein the enzyme reaction and mechanical pulverizing process of (17) are applied to "go" juice (raw "go") obtained in water-immersion process and smashing process to soybeans instead of applying on the boiled "go" as described above, and by heating and cooling when necessary.

(19) An apparatus for producing a functional soybean curd lees milk, wherein the in-liquid pulverizer of soybean curd lees described in one of (14) to (16) above is provided with a mechanism for mechanically pulverizing the soybean curd lees by sucking a raw material fluid containing soybean curd lees in the raw material fluid tank and for sending the lees milk to outside.

(20) An apparatus for producing a functional soybean curd lees milk, wherein the apparatus for producing the functional soybean curd lees milk described in one of (14) to (16) and (19) above is provided with ① a cooling mechanism, and ② a mechanism for circulating the raw material fluid applied with enzyme reaction and mechanical pulverizing or a processed slurry in the order of: raw material fluid tank→mechanical pulverizer→raw material fluid tank.

[The Inventions Relating to the Production of Functional Soybean Curd]

(21) A method for producing a functional soybean curd, comprising the steps of adding water and a plant tissue disintegrating enzyme to soybean curd lees produced in a process to produce soybean products such as soybean milk and soybean curd, performing enzyme reaction while applying mechanical pulverizing process in liquid, adding and mixing soybean milk formed in the process to produce the soybean-related food product to obtain a functional total soybean curd lees milk, and producing a functional soybean curd by adding and mixing a coagulant to said soybean curd lees milk.

(22) A method for producing a functional soybean curd, comprising the steps of adding water and a plant tissue disintegrating enzyme to soybean curd lees produced in a process to produce soybean products such as soybean milk and soybean curd, performing enzyme reaction while applying mechanical pulverizing process in liquid, adding a protein crosslinking enzyme and mixing the soybean milk formed in the process to produce the soybean-related food product, obtaining a functional total soybean curd lees milk by performing enzyme reaction, and producing a functional soybean curd by adding a coagulant to and mixing said soybean curd lees milk.

(23) A method for producing a functional soybean curd, comprising the steps of adding water and a plant tissue disintegrating enzyme to soybean curd lees produced in a process to produce soybean products such as soybean milk and soybean curd, performing enzyme reaction while applying mechanical pulverizing process in liquid, performing enzyme reaction by adding a protein crosslinking enzyme, obtaining a functional total soybean curd lees milk by adding and mixing soybean milk obtained in the process to produce the soybean-related food product, and producing a functional soybean curd by adding a coagulant to and mixing the soybean curd lees milk.

(24) A method for producing a functional soybean curd according to one of (21) to (23) above, wherein mechanical pulverizing process is performed during enzyme reaction by the protein crosslinking enzyme.

(25) A method for producing a functional soybean curd, comprising the steps of performing water-immersion process, smashing process and heating process to soybeans one after another to produce a boiled "go" (water-immersed and smashed soybean), and performing enzyme reaction described in one of (21) to (24) above to said boiled "go".

(26) A method for producing a functional soybean curd, comprising the steps of performing water-immersion process and smashing process to soybeans to produce a "go" juice (raw "go"), and performing the enzyme reaction described in one of (21) to (24) above to said "go" juice.

(27) A method for producing a functional soybean curd according to one of (21) to (26) above, wherein the enzyme reaction is characterized in that:
①adding quantity of the plant tissue disintegrating enzyme is 0.1–1.0 weight %, reaction temperature is 20° C.–60° C., and reaction time is 30–90 minutes; and
②adding quantity of the protein crosslinking enzyme is 0.1–2.0 weight %, enzyme reaction temperature is 20° C.–50° C., and enzyme reaction time is 70–10 minutes.

(28) A method for producing a functional soybean curd according to one of (21) to (27) above, wherein the mechanical pulverizing process is to pulverize the soybean curd lees to particle size of less than 100 $\mu$m.

(29) A method for producing a functional soybean curd according to (28) above, wherein the mechanical pulverizing process is performed using a colloid mill.

(30) A method for producing a functional soybean curd according to one of (22) to (29) above, wherein the protein crosslinking enzyme is transglutaminase.

(31) A method for producing a functional soybean curd according to one of (21) to (30) above, wherein the plant tissue disintegrating enzyme is an enzyme to decompose and dissolve one or more types selected from pectin, hemicellulose or cellulose to low molecular substances.

(32) An apparatus for producing a functional soybean curd, comprising a raw material fluid tank for accommodating a raw material mixture containing soybean curd lees, water, and various types of enzymes as described in one of (21) to (31) above, an in-liquid pulverizer for pulverizing the soybean curd lees to particle size of less than 100 $\mu$m, and a coagulating system for adding, mixing and coagulating soybean milk to a liquid containing soybean curd lees processed by pulverizing and coagulating and by adding a coagulant to the mixture and by heating and cooling, whereby the in-liquid pulverizer is designed in such structure that pulverizing process for the soybean curd lees and enzyme reaction are performed at the same time.

(33) An apparatus for producing a functional soybean curd, comprising a raw material fluid tank for accommodating a raw material mixture containing soybean curd lees, water, various types of enzymes, and soybean milk as described in one of (21) to (31) above, an in-liquid pulverizer for pulverizing the soybean curd lees to particle size of less than 100 $\mu$m, and a coagulating system for adding a coagulant to a mixture solution of the soybean curd lees processed by pulverizing and soybean milk, and by heating, cooling and coagulating.

(34) An apparatus for producing a functional soybean curd according to (32) to (33) above, wherein the in-liquid pulverizer is a colloid mill connected to an outlet of the raw material fluid tank.

As the other aspects of the present invention, the following inventions are proposed:

(35) A method for producing a functional soybean curd, comprising the steps of performing water-immersion process, smashing process and heating process one after another to soybeans to produce a boiled "go" (water-immersed and smashed soybeans), and performing enzyme reaction described in one of (21) to (24) above to the boiled "go";

Specifically, the method comprises the steps of: ① performing enzyme reaction by adding a plant tissue disintegrating enzyme to the boiled "go" and performing enzyme reaction by applying mechanical pulverizing on it in liquid; ② adding a plant tissue disintegrating enzyme, and performing enzyme reaction while applying mechanical pulverizing to it in liquid, and then, adding a protein crosslinking enzyme and performing enzyme reaction; ③ adding a plant tissue disintegrating enzyme and a protein decomposing enzyme, and performing enzyme reaction while applying mechanical pulverizing process in liquid; ④ adding a plant tissue disintegrating enzyme and a protein decomposing enzyme, and performing enzyme reaction while applying mechanical pulverizing process in liquid, and then, performing enzyme reaction by adding the protein crosslinking enzyme.

(36) A method for producing a functional soybean curd lees milk according to (35) above, wherein the enzyme reaction and mechanical pulverizing process of (35) are applied to "go" juice (raw "go") obtained in water-immersion process and smashing process to soybeans instead of applying on the boiled "go" as described above, and by heating and cooling when necessary.

(37) An apparatus for producing a functional soybean curd lees milk, wherein the in-liquid pulverizer of soybean curd lees described in one of (32) to (34) is provided with a mechanism for mechanically pulverizing the soybean curd lees by sucking a raw material fluid containing soybean curd lees in the raw material fluid tank and for sending the lees milk to outside.

(38) An apparatus for producing a functional soybean curd lees milk, wherein the apparatus for producing the functional soybean curd lees milk described in one of (32) to (34) and (37) is provided with ① a cooling mechanism, and ② a mechanism for circulating the raw material fluid applied with enzyme reaction and mechanical pulverizing or a processed slurry in the order of: raw material fluid tank→mechanical pulverizer→raw material fluid tank.

BEST MODE FOR CARRYING OUT THE INVENTION

Figure 3:
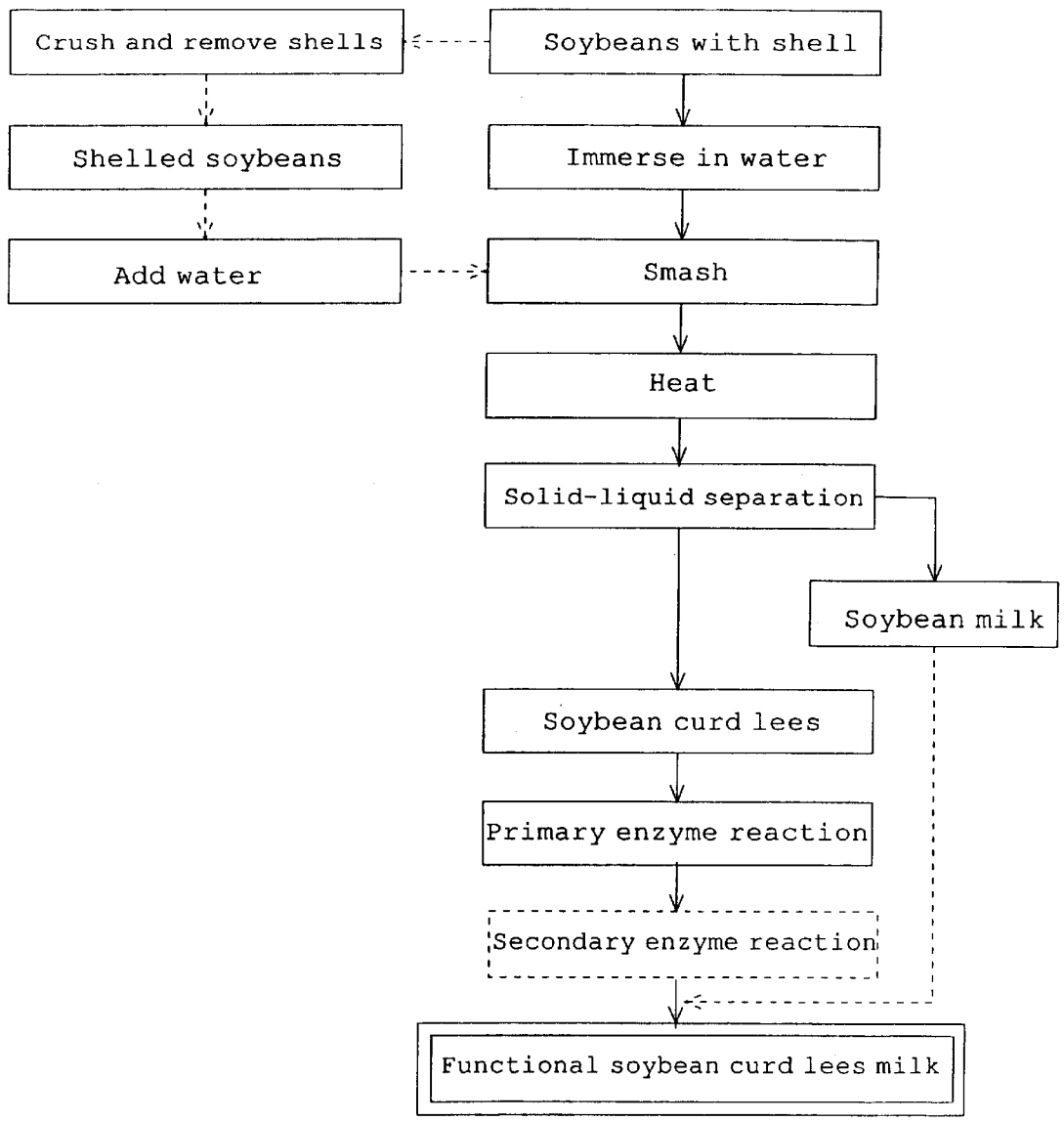
FIG. 3 is a flow chart showing a process for producing functional soybean curd lees milk according to an embodiment (solid-liquid separation mode) of the present invention.
Figure 4:
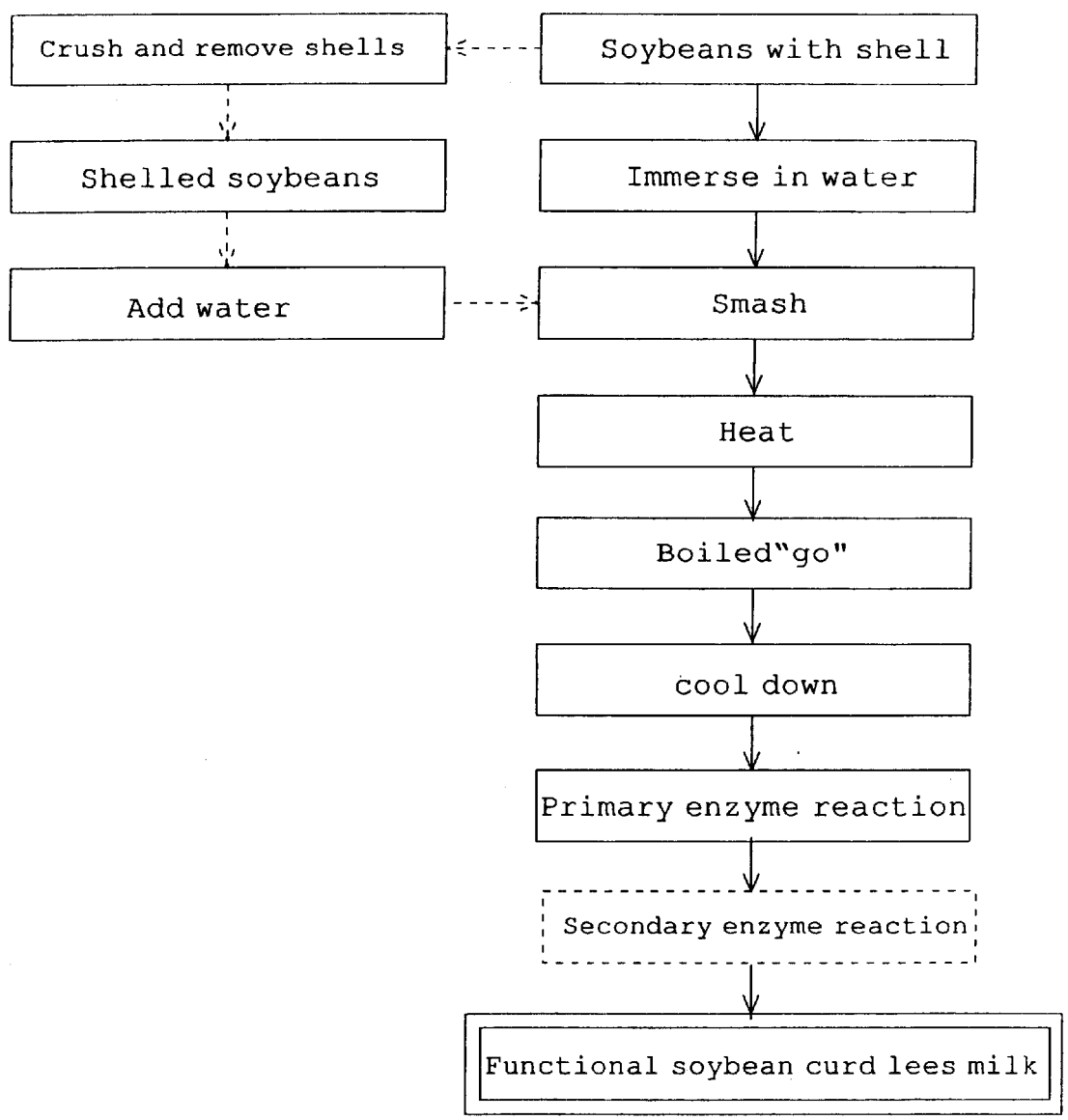
FIG. 4 is a flow chart showing a process for producing functional soybean curd lees milk according to another embodiment (boiled "go" mode) of the present invention.
Figure 5:
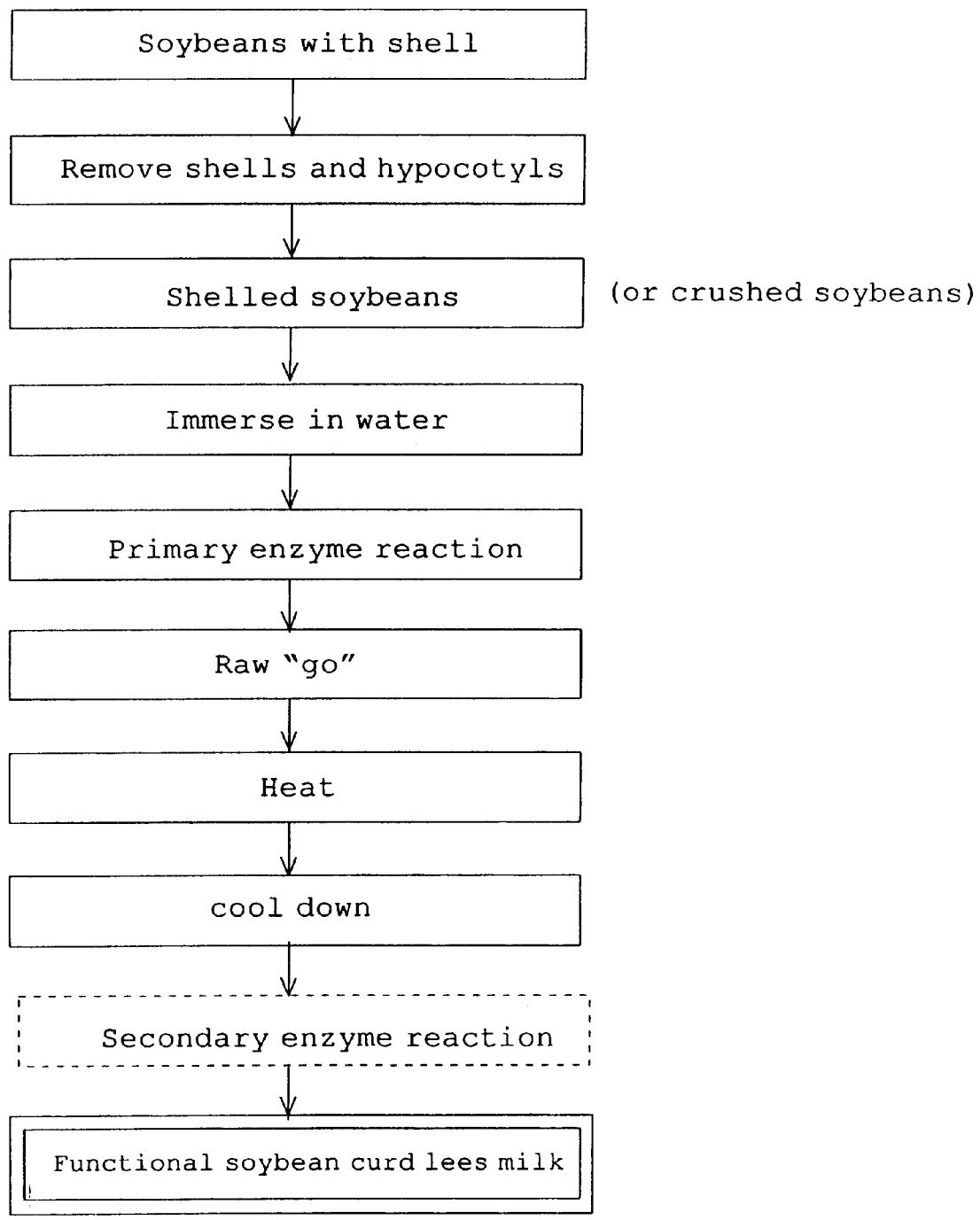
FIG. 5 is a flow chart showing a process for producing functional soybean curd lees milk according to another embodiment (raw "go" mode) of the present invention.

As embodiments relating to the "production of functional soybean curd lees milk" according to the present invention, there are three different modes: solid-liquid separation mode shown in FIG. 3, boiled "go" mode shown in FIG. 4, and raw "go" mode shown in FIG. 5. (The term "go" is defined as intermediate product in the process to produce soybean curd. Soybean is first immersed in water. After soybeans absorb sufficient quantity of water, soybeans are smashed by pulverizer, and the smashed soybeans are used for producing soybean curd and soybean milk. This intermediate product is called "go".) In Examples 1–4 and 7–9, the solid-liquid separation mode is adopted. In Examples 5, 6 and 10, the boiled "go" mode is adopted, and the raw "go" mode is used in Example 11.

Figure 6:
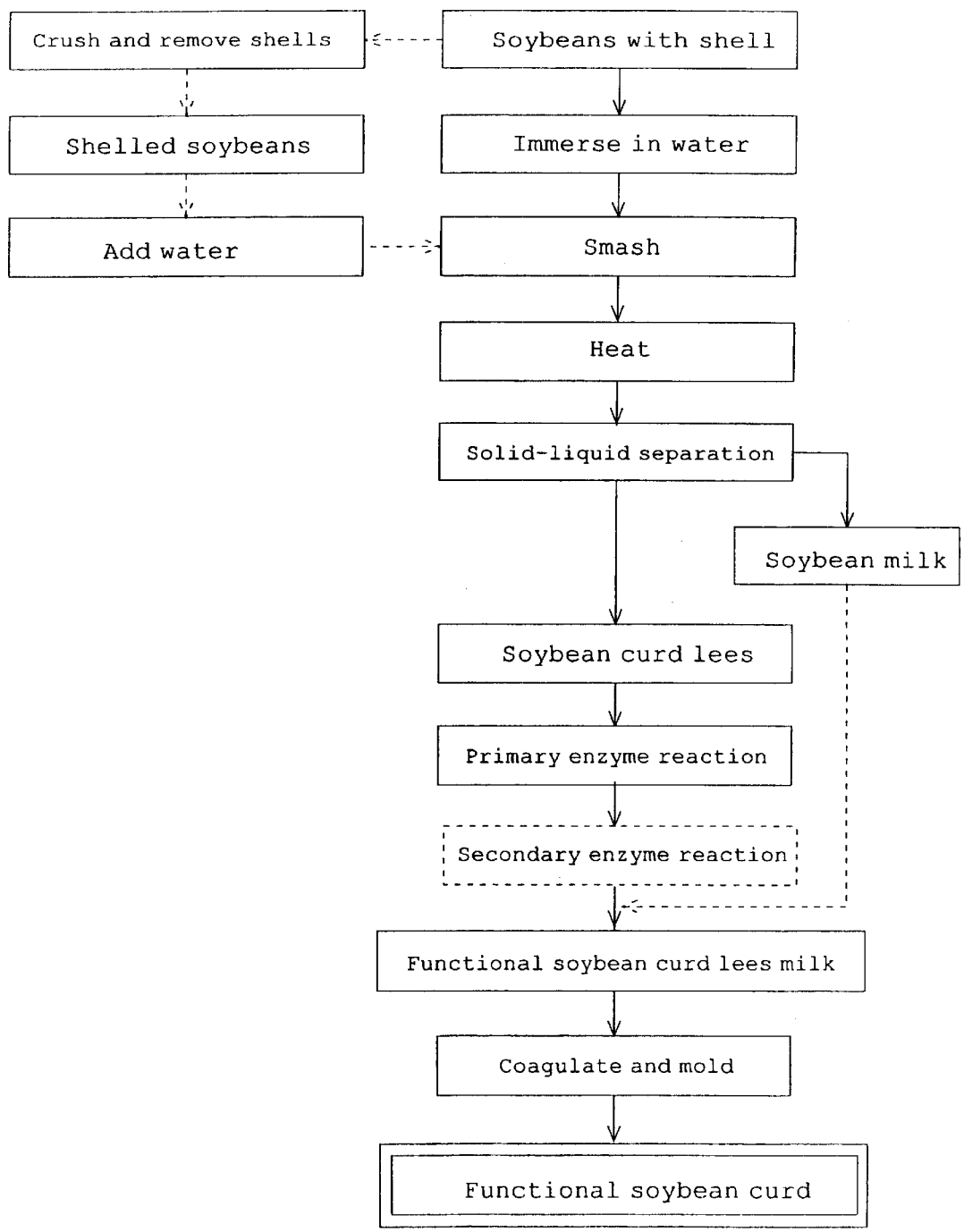
FIG. 6 is a flow chart showing a process for producing a functional soybean curd of an embodiment (solid-liquid separation mode) of the present invention.

As embodiments relating to the "production of functional soybean curd" in the present invention, there are three different modes: Solid-liquid separation mode as shown in FIG. 6, boiled "go" mode shown in FIG. 7, and raw "go" mode shown in FIG. 8. In Examples 1a, 2a, 5a, 6a and 9a as described below, the solid-liquid separation mode is adopted. In Examples 3a, 7a and 8a, the boiled "go" mode is adopted, and the raw "go" mode is used in Example 4a.

The "plant tissue disintegrating enzyme" (plant cell wall decomposing enzyme) is a type of enzyme already known in the art, which decomposes plant fiber tissues to low molecular fibers. It includes pectinase, cellulase, hemicellulase, etc., which are enzymes to decompose insoluble plant tissues having long molecular structures such as cellulose, hemicellulose, and branched pectic substances contained in lees of soybean curd.

Whole soybean with shell comprises a great number of cells. (1) Exodermis of the seed comprises pectin and hemicellulose. The hard exodermis (complex of pectin+ hemicellulose) is decomposed by pectinase and hemicellulase. (2) Endodermis contains a large amount of cellulose and consists of crude fibers. Cotyledon is made of hard tissues and is composed of a large number of cells. The cells are connected with each other by protopectin.

Along intercellular layer made of pectinic substances, cells are turned to unicellular status by pectinase and hemicellulase. Endodermis and cell walls are decomposed by cellulase, and the contents can be separated.

Plant disintegrating enzyme contains a small quantity of protease, lipase, etc. and decomposes insoluble protein called granular particles, which are present in insoluble substances. As a result, foods are turned to have good flavor when eaten. Cell membranes are also decomposed, and proteins inside are changed to soluble proteins. Thus, these are effectively utilized as the components of functional soybean curd lees milk or functional soybean curd.

In the process for producing functional soybean curd lees (functional soybean curd milk and functional total soybean curd lees milk) to be used as raw materials for food, protease is added to decompose proteins and to give better taste when eaten.

The protein granules thus separated have grain size of about 5 $\mu$m. When the protein is heated at 105° C. for 5 minutes, subunits of raw protein are made loosen. Proteins are entangled with each other and are bound by SS binding. When a coagulant is added to it and it is heated and coagulated, soybean curd is produced.

Protein decomposing enzyme (protease) is an enzyme, which catalyzes hydrolysis of peptide linkage by acting on protein and peptide. It also catalyzes reverse reaction (peptide synthesis), i.e. plastein reaction.

Based on its action, protease can be roughly divided to two types: endopectidase (proteinase) and exopeptidase (peptidase).

Endopeptidase is an enzyme which exerts action on protein and polypeptide and roughly decomposes these substances and generates low molecular peptide. Exopeptidase exerts action on peptide and generates amino acids.

In Japan, protease has been produced using Aspergillus oryzae since old times for brewing and producing bean paste, soy, and Japanese sake. Endopeptidase and exopeptidase in protease are utilized for different applications according to each purpose.

There are various types of protease: protease originated from vegetable such as papain, proline, etc., protease originated from animal such as pancreatin, rennin, etc., and also protease originated from microorganisms (such as mildew, bacteria, yeast). For the enzyme originated from animal and vegetable, animals are not raised for the purpose of producing enzyme, and there are now much expectations on future production of protease, which is originated from microorganisms because of its stable and inexpensive supply source.

As protein crosslinking enzyme, transglutaminase is generally known. It has the function to bind soybean curd lees produced by pulverizing and also to bind it with other foodstuffs. It can perform crosslinking polymerization of protein in form of covalent bonding.

As a result, protein network is reinforced, and the produced food gives good feeling and flavor when eaten (making the food more sticky and elastic). Also, it gives high water retention property to the food and also has an effect to mask and obscure odor of soybeans and odor of soybean curd lees.

The protein crosslinking enzyme transglutaminase is an enzyme, which catalyzes the reaction of intensive crosslinking (G-L linking) of "glutamine" residues and "lysine" residues, which are amino acids in protein and peptide. As the commercially available product, the following types of transglutaminase are known: transglutaminase derived from microorganisms, transglutaminase derived from mammals such as guinea pig, transglutaminase derived from fishes, and transglutaminase obtained from gene cloning. In particular, transglutaminase derived microorganisms is preferably used from economic reason.

Amylase decomposes glucides and promotes liquefaction and saccharification and is helpful to give the better taste of food.

As the coagulant to be used in the coagulation process of the functional soybean curd lees milk in the final stage of production of the functional soybean curd in the present invention, various types of coagulants already known can be used. For example, glucono-delta-lactone, calcium sulfate, magnesium hydrochloride, etc. may be used.

In particular, in the present invention, mechanical pulverizing process (in-liquid pulverizing process) is added during enzyme reaction in liquid. As a result, surface area of solid soybean curd lees is increased, and contact area with the enzyme is also increased. This makes it possible to extensively promote efficiency of enzyme reaction and to thoroughly reduce the reaction time, and the product (functional soybean curd lees milk) of higher quality can be produced from pulverized solid soybean curd lees.

As the apparatus for the in-liquid pulverizing process, the following mills may be used: rotary cylindrical mill (rolling type mill such as pot mill, tube mill, conical mill, etc.), vibratory ball mill (pulverizing unit is vibrated at high speed so that the balls inside the container are struck against each other), centrifugal ball mill (a type of ball mill to generate frictional force between balls and container wall by giving autorotation and revolution to the pulverizing unit and by adding centrifugal force to balls inside the container; e.g. planetary ball mill, high-swing mill, planetary mill), medium-agitation type mill (a type of mill to generate shear frictional force between balls by rotating an agitator in the pulverizing unit at high speed and by violently agitating the balls in the container), colloid mill (a type of mill to give shearing force to slurry between rotor rotated at high speed and the casing), etc. In the present invention, it is preferable to use the colloid mill, which provides high dispersion ability and can pulverize the material into uniform and equal size.

Figure 1:
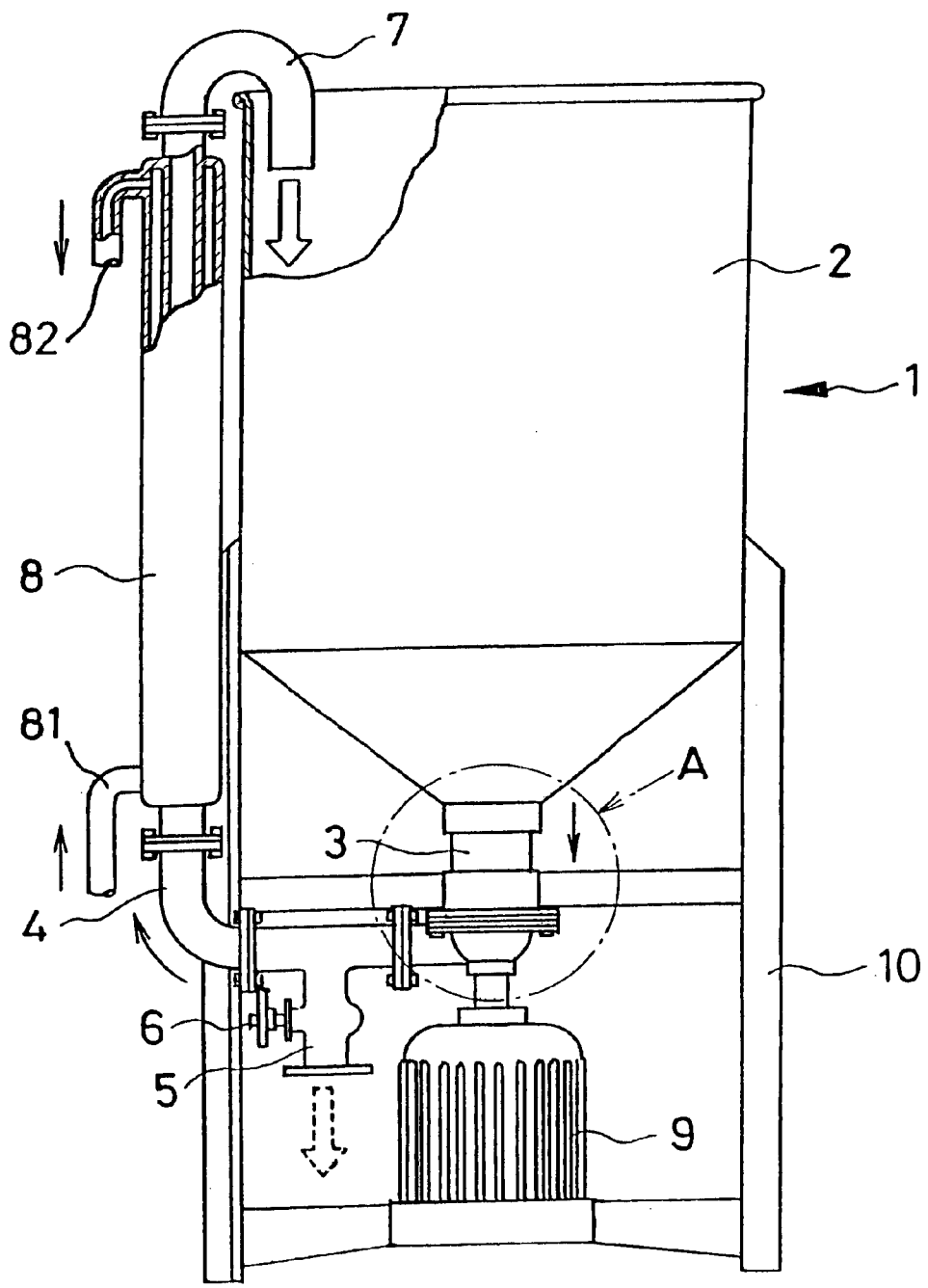
FIG. 1 is a partially cutaway front view of an apparatus for performing mechanical pulverizing process and enzyme reaction process to soybean curd lees in liquid as used in an embodiment of the present invention.

FIG. 1 is a partially cutaway front view of an apparatus, which is preferably used in embodiments of the present invention when solid soybean curd lees are processed by mechanical pulverizing process and enzyme reaction process in liquid. (Hereinafter, the apparatus is referred as "bio-mill reactor".) Using this bio-mill reactor, mechanical pulverizing. force and enzyme reaction can be simultaneously applied to soybean curd lees.

In FIG. 1, reference numeral 1 represents a bio-mill reactor, 2 is a raw material fluid tank, 3 is a colloid mill connected to an outlet at lower bottom of the tank 2, 4 is a discharge channel of the processed fluid (slurry) discharged from the colloid mill 3, 5 is a slurry discharge pipe branched off from the middle of the slurry discharge channel 4, 6 is a shutoff valve, 7 is a slurry inlet to the tank 2 formed at the end of the discharge channel 4, 8 is a cooling pipe, 9 is a motor, and 10 is a casing.

Figure 2:
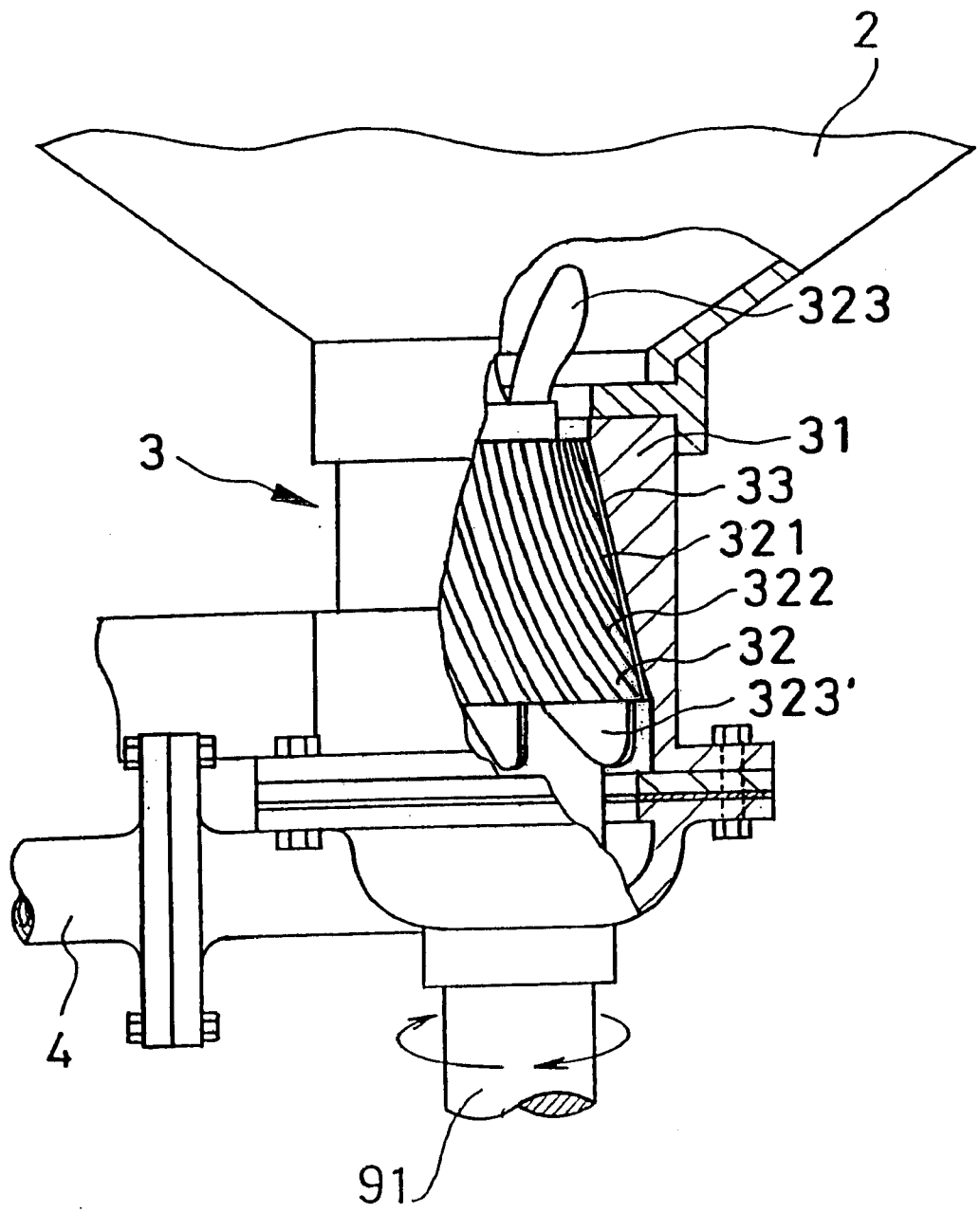
FIG. 2 is an enlarged partially cutaway front view of the apparatus of FIG. 1.

FIG. 2 is a partially cutaway enlarged front view of the colloid mill 3, which is an essential portion (A) of the bio-mill reactor 1. It comprises a stator 31, which is designed in truncated conical shape with internal space, and a rotor 32 designed in form of a truncated cone and rotatably mounted inside the stator with very small gaps 33 (normally, not more than 100 μm). On the surface of the rotor 32, ridged blades 321 with larger radius of curvature are installed at inclined position, e.g. at an angle of about 60°. A plurality of screws 323 are arranged above the rotor 32 and a plurality of screws 323' are also provided under the rotor.

Internal wall surface of the stator 31 may be designed as flat smooth surface, while it is more preferable to design with rough surface with a number of convex and concave portions. On inner wall surface of the stator, it is preferable to arrange ridged blades directed perpendicularly to the ridged blades 321. As a result, higher shearing action can be applied.

The rotor 32 is rotated in a given direction (direction of the arrow) by a shaft 9 of a motor 9 disposed underneath, and mixed fluid of the enzyme and soybean curd lees in the tank 2 above is sucked down and guided. Through curved and oblong grooves 322 formed between many inclined ridged blades 321, the mixed fluid is sucked in. Soybean curd lees are smashed through small gaps between the stator 31 and the ridged blades 321 of the rotor 32 and are mechanically pulverized and atomized (normally to 100 μm or less).

Further, in the present invention, the pulverized slurry is guided toward the discharge channel 4 by a plurality of screws 323' arranged under the rotor 32.

In this case, difference in centrifugal force occurs between the upper portion and the lower portion of the rotor 32 when it is rotated because the rotor 32 is designed in form of a truncated cone. The ridged blades exert action of a type of propeller and can discharge the slurry downward. By a plurality of screws 323' disposed under the rotor, the flow of the slurry can be accelerated.

Also, instead of the screws 323' used as means for sucking and supplying the slurry, a fluid pump may be arranged in the middle of the discharge channel 4 of the slurry to suck and supply the mixed fluid in the tank 2 to the colloid mill 3.

The cooling pipe 8 is disposed as a dual pipe around the discharge channel 4 and controls temperature of the slurry in the discharge channel 4. Reference numeral 81 represents an introducing port of heat medium such as water or hot water, and 82 is an outlet for the heat medium. When temperature of the slurry is low, heat medium such as hot water may be passed through it to heat up.

In the present invention, the cooling pipe 8 is arranged on the discharge channel 4, while a cooler may be provided inside the tank 2 or disposed in close contact with outer peripheral surface (as a jacket).

A T-pipe is branched off at the lowest position of the discharge channel 4, and a shutoff valve 6 is provided at the branched portion. When reaction has been completed after a certain period of time, the valve 6 may be opened and the screws 323' or the pump are operated to discharge the slurry out of the channel.

The valve 6 may be of manual type or of electromagnetic type.

Next, description will be given on component members and operational examples.

The raw material fluid tank 2 is designed, for example, using stainless steel (SUS 304) as a wall of 1.5 mm in thickness, and the tank has outer diameter of 1 m and height of 1 m. It is in cylindrical shape with open upper end and with the lower portion in form of inverted cone. There is no special restriction on the material and the capacity of the tank. Normally, an agitator of any desired shape is arranged in the middle of the tank. The stator 31 and the rotor 32 of the colloid mill 3 are made of a material with high strength and high hardness (such as metal, ceramics, etc.). The pipe of the discharge channel 4 is made of metal or synthetic resin.

Into the tank 2 of the bio-mill reactor with the arrangement as described above, 13 kg of soybean curd lees are charged. Then, the same quantity of water is added, and the agitator is rotated. Temperature of the mixed fluid in the tank 2 is adjusted by a heater (not shown) or a cooling element (not shown) in the tank 2 or by cooling pipe, or by supplying cold water or hot water into the tank, and 130 g of plant tissue disintegrating enzyme is added.

As a result, soybean curd lees, water and enzyme are mixed in the tank 2, and a mixed fluid is prepared, and this is sent to the colloid mill 3 disposed underneath.

In the smashing unit as described above (the portion when surface of the stator 31 comes into contact with the surface of the rotor 32), solid soybean curd lees are pulverized and are passed through the colloid mill 3 under the thrust force of the ridged blades 321 (which act as a type of propeller).

After passing through the colloid mill 3, the slurry (mixed fluid of soybean curd lees) passes through the discharge channel 4. It is cooled down to temperature of about 45° C. by the cooling pipe 8. Further, through the slurry inlet 7, it is circulated again to the tank 2.

This apparatus was operated for about 45 minutes to perform the reaction of plant tissue disintegrating enzyme (primary enzyme reaction). Then, 143 g of protein crosslinking enzyme (transglutaminase; e.g. "Activa TG-M"; trade name of transglutaminase produced by Ajinomoto Co., Inc.) was added. The mixture was then agitated for 15 minutes at temperature of about 45° C. to perform protein crosslinking enzyme reaction (secondary enzyme reaction), and crosslinking of protein was carried out. As a result, 26,000 ml of functional soybean curd lees milk with solid particle size of about 50–100 $\mu$m was produced.

As described above, using the bio-mill reactor of the present invention, pulverizing of solid soybean curd lees and enzyme decomposing reaction are performed at the same time. Surface area of soybean curd lees is increased, and active boundary surface is formed on the granules of soybean curd lees, and the enzyme reaction can be promoted at a rate of geometrical progression. As a result, solid soybean curd lees are pulverized within short time, and functional soybean curd lees milk containing a large quantity of food fibers can be produced.

For the production of the functional soybean curd, the apparatus of the present invention was operated for about 45 minutes to perform plant tissue disintegrating enzyme reaction (primary enzyme reaction). Then, 45,000 ml of soybean milk was added and mixed. Then, 390 g of protein crosslinking enzyme (transglutaminase; e.g. "Activa TG-M"; trade name of transglutaminase produced by Ajinomoto Co., Inc.) was added. The mixture was agitated for 15 minutes at temperature of about 45° C., and protein crosslinking enzyme reaction (secondary enzyme reaction) was performed to achieve crosslinking of protein. As a result, 71,000 ml of functional total soybean curd lees milk with solid particle size of about 50–100 $\mu$m was obtained. Next, 71,000 ml of the functional total soybean curd lees milk thus obtained was heated at 85° C. to deactivate the enzyme. Then, 213 g of a coagulant (magnesium hydrochloride+ glucono-delta-lactone) was added and mixed. The mixture was filled in the container and was cooled down, and 236 pieces (300 g/piece) of functional soybean curd were produced.

When a normal type bio-reactor with simple agitating function is used, pH value of soybean curd lees is generally at the level of 6.8. To perform enzyme reaction using the plant tissue disintegrating enzyme, it is necessary to add acids (such as citric acid, lactic acid, etc.) to adjust pH value to the level of 4.0 which is adequate for such reaction. When the enzyme reaction is completed, it is necessary to add alkali (such as sodium hydrogencarbonate) to bring back to the initial level of pH. Thus, problems may arise such as deterioration of the taste of the product due to pH adjusting process.

However, when this apparatus is used, reaction can be performed within short time without using pH adjusting agent. This contributes to cost cutback because the use of chemicals and the number of processes are decreased. Further, it is useful in maintaining good taste of food and in keeping safety because no additive is used.

[Embodiments of the Production of Functional Soybean Curd Lees Milk]

In the following, detailed description will be given on several examples of the present invention.

EXAMPLE 1

This is an example of the production of functional soybean curd lees milk according to the solid-liquid separation mode shown in FIG. 3.

First, 10 kg of raw material soybeans was immersed in 26,000 ml of water for 13 hours.

Next, 22,000 ml of cold water was added, and the mixture was mechanically smashed and was then heated at 105° C. for 5 minutes. Then, solid-liquid separation was carried out, and 45,000 ml of soybean milk and 13.0 kg of soybean curd lees were produced.

The soybean curd lees thus produced were placed into a raw material fluid tank 2 of the bio-mill reactor 1 as shown in FIG. 1. To this, 13,000 ml of water was added, and temperature was adjusted to 45° C. Then, 65 g of plant tissue disintegrating enzyme "Macerozyme A" (trade name; an enzyme preparation containing pectinase as main component; produced by Yakult Pharmaceutical Co., Ltd.) and 65 g of "Cellulase Onozuka 3S" (trade name; an enzyme preparation containing cellulase as main component; produced by Yakult Pharmaceutical Co., Ltd.) were added and mixed, and a mixed suspension slurry was prepared.

This mixed suspension slurry was maintained at 45° C., and enzyme reaction by the above enzymes and mechanical pulverizing process using colloid mill were performed at the same time (primary enzyme reaction). The mixed slurry was agitated and circulated between the raw material fluid tank 2 and the colloid mill 3 (mechanical smashing apparatus) for 45 minutes. Then, it was heated at 75° C. for 5 minutes to deactivate enzymes and was cooled down. Thus, 26,000 ml of functional soybean curd lees milk (Brix 8.0; pH 6.8) was produced.

The functional soybean curd lees milk was taken out from the discharge pipe 5 branched off from the discharge channel 4 of the slurry sent from the colloid mill 3 under the bio-mill reactor 1 by opening the valve 6.

The functional soybean curd lees milk thus produced contains solid matters with average particle size of 50–100 $\mu$m. It provided fragrant odor, taste, and flavor almost equal to those of soybean milk produced by the conventional method without using soybean curd lees. It had rather sweet flavor and was superior to the conventional product.

EXAMPLE 2

This is an example of the production of functional soybean curd lees milk according to solid-liquid separation method as shown in FIG. 3.

First, 10 kg of raw material soybeans was immersed in 25,000 ml of water for 13 hours.

Then, 22,000 ml of cold water was added, and the mixture was mechanically smashed. The mixture was then heated at 105° C. for 5 minutes. Solid-liquid separation was performed, and 45,000 ml of soybean milk and 12.0 kg of soybean curd lees were produced.

The soybean curd lees thus produced were placed into the raw material fluid tank 2 of the bio-mill reactor 1. To this, 18,000 ml of water was added, and temperature was adjusted to 50° C. Then, 60 g of plant tissue disintegrating enzyme "Macerozyme A", 90 g of "Cellulase A Amano" (trade name; an enzyme preparation of hemicellulase; produced by Amano Pharmaceutical Co., Ltd.), and 40 g of "Uniase BM-8" (trade name; an enzyme preparation containing amylase; produced by Yakult Pharmaceutical Co., Ltd.) were added and mixed, and a mixed suspension slurry was prepared.

This mixed suspension slurry was maintained at 50° C., and enzyme reaction by the above enzymes and mechanical pulverizing process using colloid mill were carried out at the same time. Further, the mixed slurry was agitated and circulated between the raw material fluid tank 2 and the colloid mill 3 for 40 minutes, and 30,000 ml of functional soybean curd lees milk (Brix 7; pH 6.7) was produced.

Next, to the functional soybean curd lees milk thus produced, 150 g of "Activa TG-M" (trade name; a preparation containing transglutaminase; produced by Ajinomoto Co., Inc.) was added and mixed. Activa TG-M is an enzyme to perform crosslinking "G-L bonding" of "glutamine" residue and "lysine" residue, i.e. amino acids in protein and peptide. The mixture was maintained at 50° C. for 10 minutes to perform enzyme reaction (secondary enzyme reaction), and a paste-like product (functional soybean curd lees milk) was produced.

The functional soybean curd lees milk was taken out from the discharge pipe 5 branched off from the discharge channel 4 of the slurry sent from the colloid mill 3 under the bio-mill reactor 1 by opening the valve 6.

The functional soybean curd lees milk thus taken out had solid matters with average particle size of 50–100 μm. The results of paneler test revealed that it provided fragrant odor, taste, and flavor almost equal to those of soybean milk produced by the conventional method without using soybean curd lees. It had rather sweet flavor and was superior to the conventional product. The results are summarized in Table 1.

TABLE 1

Functional total soybean curd lees milk

| Item of evaluation | Good | Moderate | No good | Total score | Comments |
|---|---|---|---|---|---|
| Color and luster | 7 | 8 | 0 | 15 | Opaque and lustrous |
| Odor | 8 | 7 | 0 | 15 | Faint odor of soybeans |
| Taste | 8 | 7 | 0 | 15 | Sweet and has good body |

When comparative analysis was performed on the functional soybean curd lees milk thus produced and the soybean milk produced by the conventional method, the functional lees milk contained a large quantity of food fibers, insoluble pectin, and soluble pectin not found in the conventional type soybean milk as shown in Table 2. It was also found that the functional soybean curd lees milk contained large quantity of glucides and oligosaccharides.

TABLE 2

| Item of analysis | Functional total soybean curd lees milk | Functional soybean curd lees milk | Soybean milk |
|---|---|---|---|
| Moisture | 87.3 g | 86.3 g | 86.3 g |
| Protein | 4.5 | 4.0 | 5.8 |
| Lipids | 2.5 | 2.5 | 3.5 |
| Glucides | 4.9 | 6.3 | 1.9 |
| Ashes | 0.6 | 0.5 | 0.5 |
| Food fibers | 1.4 | 3.4 | 0.2 |
| Pectin | 0.18 | 0.43 | 0.02 |
| Oligosaccharides | 0.24 | 0.26 | — |

EXAMPLE 3

This is an example of the production of functional soybean curd lees milk according to solid-liquid separation method shown in FIG. 3.

First, 10 kg of raw material soybeans was immersed in 26,000 ml of water for 13 hours.

Then, 22,000 ml of cold water was added, and the mixture was mechanically smashed. The mixture was then heated at 105° C. for 5 minutes to perform solid-liquid separation, and 45,000 ml of soybean milk and 13.0 kg of soybean curd lees were produced.

The soybean curd lees thus produced were placed into the raw material fluid tank 2 of the bio-mill reactor 1. To this, 13,000 ml of water was added, and temperature was adjusted to 45° C. Then, 65 g of plant tissue disintegrating enzyme "Macerozyme A", 65 g of "Cellulase Onozuka 3S", and 26 g of protein decomposing enzyme "Protease R Amano" (trade name; produced by Amano Pharmaceutical Co., Ltd.) were added and mixed. Thus, a mixed suspension slurry was prepared.

This mixed suspension slurry was maintained at 45° C., and enzyme reaction by the above enzymes and mechanical pulverizing processing using colloid mill were performed at the same time. The mixed slurry was agitated and circulated between the raw material fluid tank 2 and the colloid mill 3 (mechanical smashing apparatus) for 45 minutes. Then, it was heated at 75° C. for 5 minutes to deactivate enzymes and was cooled down, and 26,000 ml of functional soybean curd lees milk (Brix 8.0; pH 6.8) was produced.

The functional soybean curd lees milk was taken out from the discharge pipe 5 branched off from the discharge channel 4 of the slurry sent from the colloid mill 3 under the bio-mill reactor 1 by opening the valve 6.

The functional soybean curd lees milk thus produced contains solid matters with average particle size of 50–100 μm. It provided fragrant odor, taste, and flavor almost equal to those of soybean milk produced by the conventional method without using soybean curd lees. It had rather sweet flavor and was superior to the conventional product.

EXAMPLE 4

First, 10 kg of raw material soybeans was immersed in 25,000 ml of water for 13 hours.

Then, 23,000 ml of cold water was added, and the mixture was mechanically smashed. Then, this was heated at 105° C. for 5 minutes, and solid-liquid separation was performed, and 45,000 ml of soybean milk and 13 kg of soybean curd lees were produced.

The soybean curd lees thus obtained were charged into "Bio-Mill Reactor" (trade name; a bio-mill reactor with colloid mill; manufactured by Sawa Industry Co., Ltd.). Further, 17,000 ml of water was added, and temperature was adjusted to 50° C. Then, 60 g of soybean tissue disintegrating enzyme "Macerozyme A" (trade name; a pectinase enzyme preparation produced by Yakult Pharmaceutical Co., Ltd.), 90 g of "Cellulase Onozuka 3S" (trade name; a cellulase enzyme preparation produced by Yakult Pharmaceutical Co., Ltd.) and 30 g of "Protease R Amano" (trade name; a protease enzyme preparation produced by Amano Pharmaceutical Co., Ltd.) were added and mixed, and a mixed suspension slurry was prepared.

This mixed suspension slurry was maintained at 50° C., and enzyme reaction by the enzymes and mechanical pulverizing processing using colloid mill were performed at the same time. The mixed slurry was agitated and circulated in the mechanical pulverizer for 45 minutes, and 30,000 ml of functional soybean curd lees milk (Brix 7.0; pH 6.8) was produced.

Next, to the functional soybean curd lees milk thus obtained, 180 g of "Activa TG-M" (trade name; a preparation containing transglutaminase; produced by Ajinomoto Co., Inc.) was added and mixed. This was maintained at 50° C. for 13 minutes to perform enzyme reaction (secondary enzyme reaction), and 30,000 ml of functional soybean curd lees milk (Brix 7.0; pH 6.8) was prepared.

EXAMPLE 5

This is an example of the production of functional soybean curd lees milk according to the boiled "go" mode as shown in FIG. 4.

First, 1 kg of raw material soybeans was immersed in 2,500 ml of water.

Then, 1,500 ml of cold water was added, and the mixture was mechanically smashed. This smashed product was heated at 105° C. for 5 minutes to prepare boiled "go" (water-immersed and smashed soybeans). This boiled "go" was placed into a bio-reactor (enzyme reactor), and temperature was adjusted to 50° C. Then, 10 g of "Macerozyme A", 15 g of "Cellulase Onozuka 3S", and 4 g of "Uniase BM-8" were added, and a mixed suspension slurry was prepared.

This mixed suspension slurry was placed into a bio-reactor with mechanical pulverizer. Keeping the temperature at 50° C., enzyme reaction by the enzymes and mechanical pulverizing force were applied (primary enzyme reaction). The mixed slurry was agitated and circulated between the bio-reactor and the mechanical pulverizer for 40 minutes, and 5,000 ml of boiled "go" paste (Brix 15; pH 6.8) was produced. Then, to the boiled "go" paste thus obtained, 2,500 ml of water and 40 g of "Activa TG-M" were added and mixed. The mixture was maintained at 50° C. for 10 minutes to perform enzyme reaction (secondary enzyme reaction). As a result, 7,500 ml of functional total soybean curd lees milk (Brix 11; pH 6.8) using total soybean tissues was produced.

EXAMPLE 6

This is also an example of the production of functional soybean curd lees milk according to the boiled "go" mode shown in FIG. 4.

First, 1 kg of raw material soybeans was immersed in 2,500 ml of water for 13 hours.

Then, 1,500 ml of cold water was added, and the mixture was mechanically smashed. The mixture was then heated at 105° C. for 5 minutes to prepare the boiled "go". The boiled "go" was placed into a bio-reactor (enzyme reactor), and temperature was adjusted to 50° C. Then, 10 g of "Macerozyme A", 15 g of "Cellulase Onozuka 3S", and 4 g of "Uniase BM-8" were added, and a mixed suspension slurry was produced.

This mixed suspension slurry was placed into a bio-reactor with mechanical pulverizer. Keeping the temperature at 50° C., enzyme reaction by the above enzymes and mechanical pulverizing force were applied (primary enzyme reaction). The mixed slurry was agitated and circulated between the bio-reactor and the mechanical pulverizer for 40 minutes, and 5,000 ml of boiled "go" paste (Brix 15; pH 6.8) was produced. Next, to the boiled "go" paste thus obtained, 2,500 ml of water, 40 g of "Activa TG-M", and 150 g of "Trehaose" (trade name; a high purity water-containing trehalose preparation; produced by Hayashibara Biochemical Laboratories, Inc.) were added and mixed. The mixture was maintained at 50° C. for 10 minutes to perform enzyme reaction (secondary enzyme reaction), and 7,500 ml of functional total soybean curd lees milk (Brix 11; pH 6.8) using total soybean tissues was produced.

On the functional soybean curd lees milk obtained in Example 5, paneler test and analysis were performed by the same procedure as shown in Table 1 and Table 2. Satisfactory results equal or superior to the results of Example 2 were obtained.

EXAMPLE 7

First, 10 kg of raw material soybeans was immersed in 25,000 ml of water for 13 hours.

Then, 23,000 ml of cold water was added, and the mixture was mechanically smashed. The mixture was then heated at 105° C. for 5 minutes, and solid-liquid separation was performed, and 45,000 ml of soybean milk and 13 kg of soybean curd lees were produced.

The soybean curd lees thus obtained were charged into a bio-mill reactor. Further, 17,000 ml of water was added, and temperature was adjusted to 50° C. Then, 60 g of "Macerozyme A", 90 g of "Cellulase Onozuka 3S", and 30 g of protein decomposing enzyme "Protease R Amano" were added and mixed, and a mixed suspension slurry was produced.

This mixed suspension slurry was maintained at 50° C. to perform enzyme reaction by the enzymes and mechanical pulverizing process using colloid mill at the same time. The mixed slurry was agitated and circulated in the mechanical pulverizer for 45 minutes, and 30,000 ml of functional soybean curd lees milk (Brix 7; pH 6.8) was produced.

Next, to the functional soybean curd lees milk thus obtained, 180 g of "Activa TG-M" was added and mixed. The mixture was maintained at 50° C. for 13 minutes to perform enzyme reaction (secondary enzyme reaction), and 30,000 ml of functional soybean curd lees milk (Brix 7.0; pH 6.8) was produced.

EXAMPLE 8

First, 10 kg of raw material soybeans was immersed in 25,000 ml of water for 13 hours.

Then, 23,000 ml of cold water was added, and the mixture was mechanically smashed. This was heated at 105° C. for 5 minutes, and solid-liquid separation was performed, and 45,000 ml of soybean milk and 13 kg of soybean curd lees were produced.

The soybean curd lees thus obtained were charged into "Bio-Mill Reactor" (trade name; bio-reactor with colloid mill manufactured by Sawa Industry Co., Ltd.). Further, 17,000 ml of water was added, and temperature was adjusted to 50° C. Then, 60 g of "Macerozyme A", 90 g of "Cellulase A Amano", and 40 g of "Uniase BM-8" were added, and a mixed suspension slurry was produced.

This slurry was maintained at 50° C. By applying mechanical pulverizing force, enzyme reaction (primary enzyme reaction) was performed. Enzyme reaction slurry in the bio-mill reactor was circulated for 40 minutes, and 30,000 ml of soybean curd lees milk (Brix 7.0; pH 6.7) was obtained. In the soybean curd lees milk thus obtained, average particle size of solid matters was 100–50 μm. Next, to the soybean curd lees milk thus obtained, 45,000 ml of the above soybean milk (Brix 13.0; pH 6.7) was added. Then, 400 g of "Activa" was added. Enzyme reaction (secondary enzyme reaction) was performed at 50° C. for 10 minutes, and 75,000 ml of functional total soybean curd lees milk (Brix 10.5; pH 6.7) using total soybean tissues was obtained.

EXAMPLE 9

First, 13 kg of the soybean curd lees obtained in Example 7 was charged into "Bio-Mill Reactor" (trade name; a bio-reactor with colloid mill produced by Sawa Industry Co., Ltd.). Further, 13,000 ml of water was added, and temperature was adjusted to 50° C. Then, 60 g of "Macerozyme A", 70 g of "Cellulase A Amano", and 40 g of "Uniase BM-8" were added, and a mixed suspension slurry was produced.

To this slurry, mechanical pulverizing force was applied at 50° C., and the slurry was agitated and circulated to perform enzyme reaction (primary enzyme reaction) for 40 minutes. In the soybean curd lees milk thus produced, average particle size of solid matters was 100–50 μm.

To the soybean curd lees milk thus obtained, 150 g of "Activa" was added. Enzyme reaction (secondary enzyme reaction) was performed at 50° C. for 12 minutes, and 26,000 ml of soybean curd lees milk (Brix 8.0; pH 6.8) was obtained.

To the soybean curd lees milk thus obtained, 44,000 ml of soybean milk (Brix 13.0; pH 6.8) was added. The mixture was filtered through a 120-mesh filter to remove impurities such as hypocotyls, and 70,000 ml of functional total soybean curd lees milk (Brix 11.5; pH 6.8) was obtained.

EXAMPLE 10

This is also an example of the production of functional soybean curd lees milk according to the boiled "go" mode as shown in FIG. 4.

Outer shells and hypocotyls were removed from raw material whole soybeans, and the soybeans were pressurized to obtain the shelled soybeans. Then, 10 kg of the shelled soybeans was immersed in 25,000 ml of water for 20 minutes. Then, 35,000 ml of cold water was added, and the mixture was ground down. The mixture was then heated at 105° C. for 5 minutes, and the mixture was steam-boiled to obtain boiled "go". This boiled "go" was placed into a bio-mill reactor. Temperature was adjusted to 50° C. Then, 150 g of "Macerozyme A", 200 g of "Cellulase A Amano", and 70 g of "Protease R Amano" were added, and a mixed suspension slurry was produced.

To this slurry, mechanical pulverizing force was applied, and the mixed slurry was agitated and circulated to perform enzyme reaction (primary enzyme reaction) for 40 minutes. In the soybean curd lees milk thus obtained, average particle size of solid matters was 100–50 μm.

Then, to the soybean curd lees milk thus obtained, 350 g of "Activa" was added. Enzyme reaction (Secondary enzyme reaction) was performed at 50° C. for 12 minutes, and 70,000 ml of functional total soybean curd lees milk (Brix 12.0; pH 6.8) was obtained.

EXAMPLE 11

This is an example of the production of functional soybean curd lees milk according to the raw "go" mode as shown in FIG. 5.

Outer shells and hypocotyls were removed from raw material soybeans. Then, 10 kg of the shelled soybeans was pulverized and was charged into a bio-mill reactor. Then, 60,000 ml of warm water kept at 40° C., 150 g of "Macerozyme A", 200 g of "Cellulase A Amano", and 40 g of "Uniase BM-8" were added and mixed, and a mixed suspension slurry was produced.

Primary enzyme reaction was performed on this suspension slurry for 50 minutes to produce raw "go". Then, this was steam-boiled at 105° C. for 5 minutes and was quickly cooled down to 50° C., and 350 g of "Activa" was added. Enzyme reaction (secondary enzyme reaction) was performed at 50° C. for 12 minutes, and 70,000 ml of functional total soybean curd lees milk (Brix 12.0; pH 6.8) was obtained.

The results of paneler test revealed that the functional soybean curd lees milk produced in the above example was equal or superior to the soybean milk produced by the conventional method in color tone, odor, taste and flavor when eaten. The results are summarized in Table 3.

TABLE 3

Functional total soybean curd lees milk

| Item of evaluation | Good | Moderate | No good | Total score | Comments |
|---|---|---|---|---|---|
| Color and luster | 6 | 9 | 0 | 15 | Opaque and lustrous |
| Odor | 8 | 7 | 0 | 15 | Faint odor of soybeans |
| Taste | 8 | 7 | 0 | 15 | Sweet and has good body; palatable |

When comparative analysis was performed on the functional soybean curd lees milk thus obtained and the soybean milk produced by the conventional method, the functional soybean curd lees milk contains such large quantity of food fibers, insoluble pectin, and soluble pectin as not found in the soybean milk produced by the conventional method. Also, it was found that the functional soybean curd lees milk contains large quantity of glucides and oligosaccharides.

TABLE 4

| Item of analysis | Functional total soybean curd lees milk | Functional soybean curd lees milk | Soybean milk |
|---|---|---|---|
| Moisture | 88.0 g | 86.3 g | 88.2 g |
| Protein | 4.8 | 4.0 | 5.8 |
| Lipids | 3.1 | 2.5 | 3.5 |
| Glucides | 3.2 | 6.3 | 1.9 |
| Ashes | 0.6 | 0.5 | 0.6 |
| Food fibers | 1.8 | 3.4 | 0.2 |
| Pectin | 0.14 | 0.43 | 0.02 |
| Oligosaccharides | 0.45 | 0.26 | 0.65 |

Comparative Example

First, 10 kg of raw material whole soybeans was immersed in 25,000 ml of water for 13 hours.

Next, 22,000 ml of cold water was added, and the mixture was mechanically smashed. Then, it was heated at 105° C. for 5 minutes, and solid-liquid separation was performed, and 45,000 ml of soybean milk and 12.0 kg of soybean curd lees were obtained.

The soybean curd lees thus obtained were placed into the tank, and 30,000 ml of water was added. Lactic acid was added to adjust pH value to 4.5. Temperature was adjusted to 50° C. Then, 100 g of plant tissue disintegrating enzyme "Macerozyme A" and 110 g of "Cellulase Onozuka 3S" were added and mixed, and a mixed suspension slurry was prepared.

This suspension slurry was maintained at 45° C. Enzyme reaction was performed while agitating for 180 minutes, and sodium hydrogencarbonate was added to adjust pH value to 7.0, and functional soybean curd lees milk was obtained.

In the functional soybean curd lees milk thus obtained, average particle size of solid matters was 400–1500 $\mu$m. It had specific odor of beans, and taste was poor. It gave rough and gritty feeling when eaten, and this adversely affected the taste of this food.

[Embodiments of the Production of Functional Soybean Curd]

In the following, detailed description will be given on the present invention referring to several examples.

EXAMPLE 1a

This is an example of the production of functional soybean curd using functional soybean curd lees milk according solid-liquid separation mode as shown in FIG. 6.

First, 10 kg of raw material soybeans was immersed in 26,000 ml of water for 13 hours.

Then, 22,000 ml of cold water was added, and the mixture was mechanically smashed. This was then heated at 105° C. for 5 minutes, and solid-liquid separation was performed to produce 45,000 ml of soybean milk and 13.0 kg of soybean curd lees.

The soybean curd lees thus obtained were placed into the raw material fluid tank 2 of the bio-mill reactor 1. To this, 13,000 ml of water was added, and temperature was adjusted to 45° C. Then, 65 g of plant tissue disintegrating enzyme "Macerozyme A" (trade name; an enzyme preparation containing pectinase as main component; produced by Yakult Pharmaceutical Co., Ltd.), and 65 g of "Cellulase Onozuka 3S" (trade name; an enzyme preparation containing cellulase as main component; produced by Yakult Pharmaceutical Co., Ltd.) were added and mixed, and a mixed suspension slurry was prepared.

This mixed suspension slurry was maintained at 45° C., and enzyme reaction by the above enzymes and mechanical pulverizing processing using colloid mill were performed at the same time. This mixture was agitated and circulated between the raw material fluid tank 2 and the colloid mill 3 (mechanical pulverizer) for 45 minutes. Then, it was heated at 75° C. for 5 minutes to deactivate enzymes. Then, it was cooled down, and 26,000 ml of functional soybean curd lees milk (Brix 8.0; pH 6.8) was produced.

Then, to the functional soybean curd lees milk thus obtained, 45,000 ml of the above soybean milk (Brix 13; pH 6.7) was added. Then, 390 g of "Activa TG-M" (trade name; a preparation containing transglutaminase; produced by Ajinomoto Co., Inc.) was added and mixed. Enzyme reaction (secondary enzyme reaction) was performed at 45° C. for 15 minutes, and 71,000 ml of functional total soybean curd lees milk (Brix 11.5; pH 6.8) using total tissues of soybeans was produced.

This functional total soybean curd lees milk was taken out from the discharge pipe 5 branched off from the discharge channel 4 of the slurry sent from the colloid mill 3 under the bio-mill reactor 1 by opening the valve 6. Then, this was filtered through a 120-mesh screen to remove impurities such as hypocotyls. Then, 213 g of a coagulant (magnesium hydrochloride+glucono-delta-lactone (trade name; a coagulant produced by Akoh Chemical Co., Ltd.)) was added and mixed. The mixture was filled in a container and was heated at 85° C. for 45 minutes. Then, it was cooled down, and 236 pieces of functional soybean curds (300 g/piece) were produced.

EXAMPLE 2a

This is an example of the production of functional soybean curd using functional soybean curd lees milk according to solid-liquid separation mode as shown in FIG. 6.

First, 10 kg of raw material soybeans was immersed in 26,000 ml of water for 13 hours.

Next, 22,000 ml of cold water was added, and the mixture was mechanically smashed. It was then heated at 105° C. for 5 minutes, and solid-liquid separation was performed, and 45,000 ml of soybean milk and 13.0 kg of soybean curd lees were produced.

The soybean curd lees thus obtained were placed into the raw material fluid thank 2 of the bio-mill reactor 1. To this, 13,000 ml of water was added, and temperature was adjusted to 45° C. Then, 65 g of plant tissue disintegrating enzyme "Macerozyme A" (trade name; an enzyme preparation containing pectinase as main component; produced by Yakult Pharmaceutical Co., Ltd.), and 65 g of "Cellulase Onozuka 3S" (trade name; an enzyme preparation containing cellulase as main component; produced by Yakult Pharmaceutical Co., Ltd.) were added and mixed, and a mixed suspension slurry was prepared.

This mixed suspension slurry was maintained at 45° C., and enzyme reaction by the above enzymes and mechanical pulverizing processing using colloid mill were performed at the same time. The mixed suspension slurry was agitated and circulated between the raw material fluid tank 2 and the colloid mill 3 (mechanical pulverizer) for 45 minutes. Next, 143 g of "Activa TG-M" (trade name; a preparation containing transglutaminase; produced by Ajinomoto Co., Inc.) was added and mixed. Enzyme reaction (secondary enzyme reaction) was performed at 45° C. for 15 minutes, and 26,000 ml of functional soybean curd lees milk (Brix 8.0; pH 6.8) intensively crosslinked with protein bonding was produced.

To this functional soybean curd lees milk, 45,000 ml of the above soybean milk (Brix 13.0; pH 6.8) was added and mixed. The mixture was then filtered through a 120-mesh screen to remove impurities such as hypocotyls, and 71,000 ml of functional total soybean curd lees milk (Brix 11.5; pH 6.8) was obtained. Next, 213 g of a coagulant (magnesium hydrochloride+glucono-delta-lactone) was added and mixed. The mixture was filled in a container, and this was heated at 85° C. for 45 minutes. Then, it was cooled down, and 236 pieces of functional soybean curds (300 g/piece) were produced.

The results of paneler test on the functional soybean curds (total soybean curds) thus obtained are shown in Table 1a.

Also, the results of analysis of the component in the functional soybean curd product are compared with those of fine-grained bean curd produced by the conventional method in Table 2a.

As shown in this table, the results of the test of the functional soybean curds produced according to the present invention were within the range of "moderate" to "good" in all items of evaluation: color and luster, odor, taste, and flavor when eaten. Also, it was found that the functional soybean curds of the present invention contain large quantity of food fibers, pectin and oligosaccharides, which are not contained in the fine-grained bean curd produced by the conventional method.

TABLE 1a

| Item of evaluation | Good | Moderate | No good | Total score | Comments |
|---|---|---|---|---|---|
| Color and luster | 7 | 8 | 0 | 15 | Opaque and lustrous |
| Odor | 8 | 7 | 0 | 15 | Faint odor of soybeans |
| Taste | 8 | 7 | 0 | 15 | Sweet and has good body |
| Flavor when eaten | 8 | 7 | 0 | 15 | Palpable and tasty |
| Total | 31 | 29 | 0 | 60 | Tasty and in good repute |

*15 panelers

TABLE 2a

| Item of analysis | Functional soybean curd | Fine-grained soybean curd |
|---|---|---|
| Moisture | 88.4 g | 89.4 g |
| Protein | 3.7 | 5.0 |
| Lipids | 3.1 | 3.3 |
| Glucides | 1.8 | 1.7 |
| Food fibers | 2.5 | 0 |
| Pectin | 0.19 | 0 |
| Oligosaccharides | 0.51 | — |

EXAMPLE 3a

Figure 7:
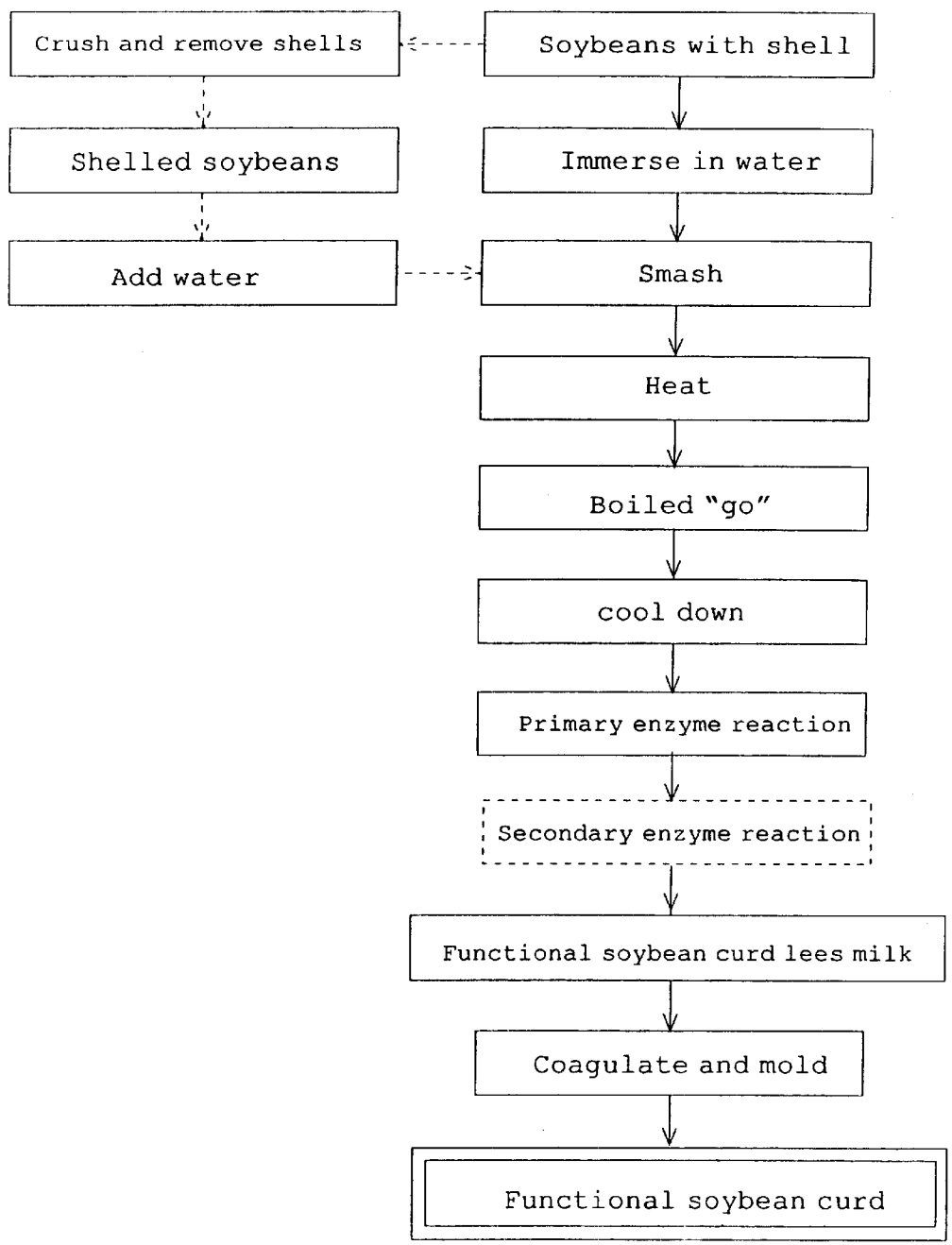
FIG. 7 is a flow chart showing a process for producing a functional soybean curd of another embodiment (boiled "go" mode) of the present invention.
Figure 8:
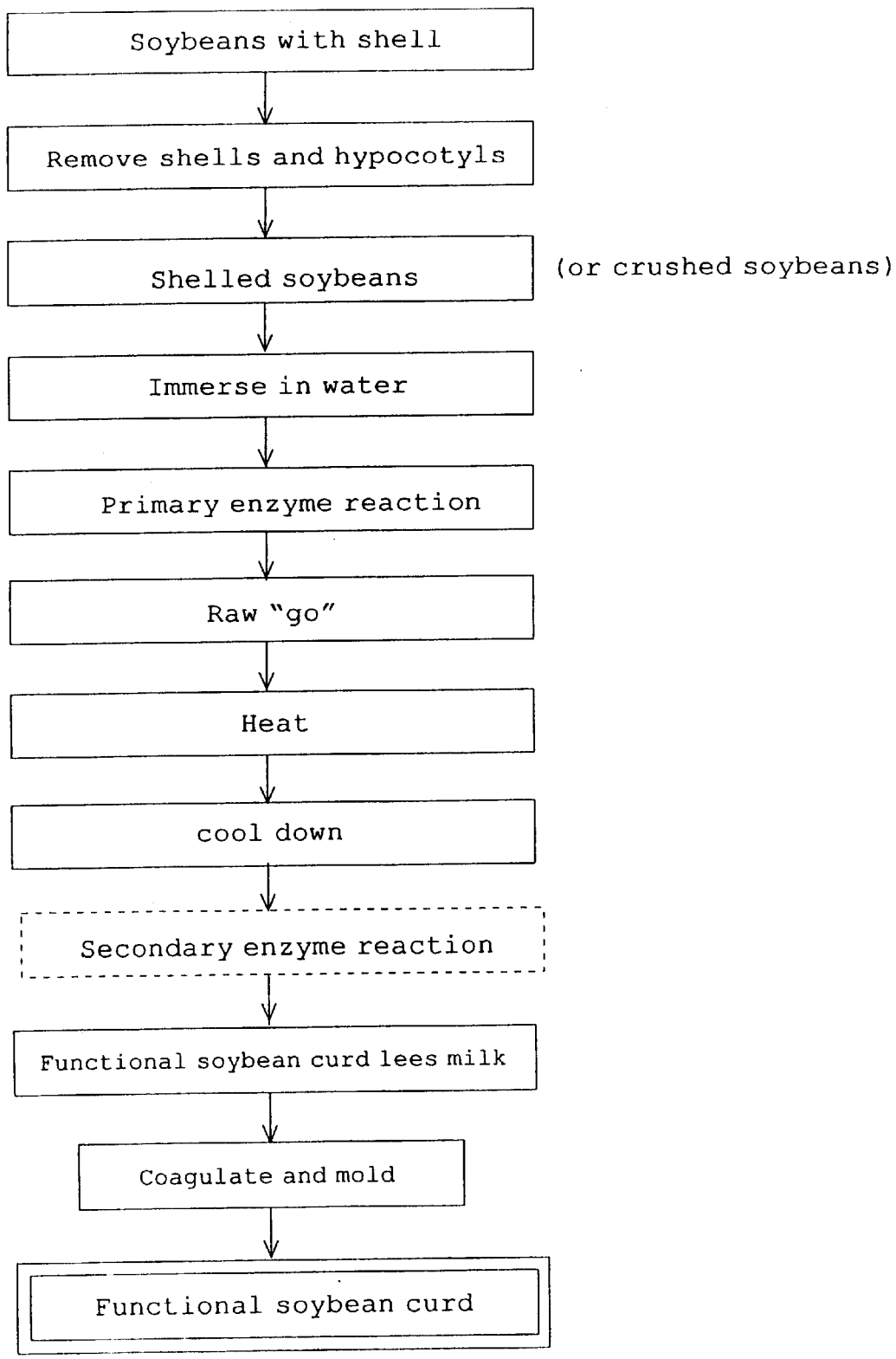
FIG. 8 is a flow chart showing a process for producing a functional soybean curd of an embodiment (raw "go" mode) of the present invention.

This is an example of the production of functional soybean curd using functional soybean curd lees milk according to boiled "go" mode as shown in FIG. 7.

First, 10 kg of raw material whole soybeans was immersed in 25,000 ml of water for 13 hours.

Then, 36,000 ml of cold water was added, and the mixture was mechanically smashed. It was then steam-boiled at 105° C. for 5 minutes to produce boiled "go". This was placed into the raw material fluid tank 2 of the bio-mill reactor 1. Temperature was adjusted to 45° C., and then, 180 g of plant tissue disintegrating enzyme "Macerozyme A" and 175 g of "Cellulase Onozuka 3S" were added and mixed. Temperature was maintained at 45° C., and enzyme reaction by the above enzymes and mechanical pulverizing processing using colloid mill were performed at the same time. The slurry was agitated and circulated between the raw material fluid tank 2 and the colloid mill 3 (mechanical pulverizer) for 45 minutes. Next, 390 g of "Activa TG-M" was added and mixed. Enzyme reaction (secondary enzyme reaction) was performed at 45° C. for 15 minutes, and 71,000 ml of functional total soybean curd lees milk (Brix 12.0; pH 6.8) intensively crosslinked with protein bonding was produced.

To this functional total soybean curd lees milk, 213 g of a coagulant (magnesium hydrochloride+glucono-delta-lactone) was added and mixed. This was filled into a container and was heated at 85° C. for 45 minutes and was cooled down, and 236 pieces of functional soybean curds (300 g/piece) were produced.

EXAMPLE 4a

This is an example of the production of functional soybean curd using functional soybean curd lees milk according to raw "go" mode.

First, outer shells and hypocotyls were removed from 10 kg of soybeans, and the shelled soybeans were pulverized. To this, 61,000 ml of warm water kept at 40° C., 180 g of plant tissue disintegrating enzyme "Macerozyme A", and 175 g of "Cellulase Onozuka 3S" were added, and the mixture was placed into the raw material fluid tank 2 of the bio-mill reactor 1. Temperature was maintained at 45° C., and enzyme reaction by the above enzymes and mechanical pulverizing processing using colloid mill were performed at the same time. The mixture was then agitated and circulated between the raw material fluid tank 2 and the colloid mill 3 (mechanical pulverizer) for 45 minutes, and raw "go" was obtained. Then, this was steam-boiled at 105° C. for 5 minutes and was quickly cooled down to 45° C. Then, 390 g of "Activa TG-M" was added and mixed. Enzyme reaction (secondary enzyme reaction) was performed at 45° C. for 15 minutes, and 71,000 ml of functional total soybean curd lees milk (Brix 12.0; pH 6.8) intensively crosslinked with protein bonding was produced.

To this functional total soybean curd lees milk, 213 g of a coagulant (magnesium hydrochloride+glucono-delta-lactone) was added and mixed. The mixture was then filled in a container and was heated at 85° C. for 45 minutes and was cooled down. Thus, 236 pieces of functional soybean curds (300 g/piece) were produced.

EXAMPLE 5a

First, 1 kg of raw material soybeans was immersed in 2,500 ml of water for 13 hours.

Then, 2,200 ml of cold water was added, and the mixture was mechanically smashed. It was then heated at 105° C. for 5 minutes and solid-liquid separation was performed, and 4,500 ml of soybean milk and 1.2 kg of soybean curd lees were produced.

The soybean curd lees thus obtained were placed in a bio-reactor (enzyme reactor), and 1,800 ml of water was added and temperature was adjusted to 50° C. Then, 6 g of "Macerozyme A", 9 g of "Cellulase A Amano", and 4 g of "Uniase BM-8" were added, and a mixed suspension slurry was produced.

This mixed suspension slurry was placed into a bio-reactor with mechanical pulverizer. Keeping the temperature at 50° C., enzyme reaction by the above enzymes and mechanical pulverizing force were applied (primary enzyme reaction). The slurry was agitated and circulated between the bio-reactor and the mechanical pulverizer for 40 minutes, and 3,000 ml of functional soybean curd lees milk (Brix 7; pH 6.7) was produced. Next, to the functional soybean curd lees milk thus obtained, 4,500 ml of soybean milk (Brix 13; pH 6.7) was added. Then, 40 g of "Activa TG-M" was added and mixed. Enzyme reaction (secondary enzyme reaction) was performed at 50° C. for 10 minutes, and 7,500 ml (Brix 10; pH 6.7) of functional total soybean curd lees milk using total tissues of soybeans was produced.

This was separated from the bio-reactor and was filtered through a 100-mesh vibratory screen to remove hypocotyls. Then, it was heated at 85° C. to sterilize and to deactivate enzymes. Then, 15 g of "Pearl" (trade name; a coagulant produced by Akoh Chemical Co., Ltd.) and 10 g of "glucono-delta-lactone" were dissolved in small quantity of water, and this solution was added to the above product and was mixed. Then, the mixture was sealed in a container and was cooled down. Thus, 25 pieces of functional soybean curds using total tissues of soybeans (the whole soybean curd) (300 g/piece) were produced.

The results of evaluation revealed that this functional soybean curd was equal or superior to the soybean curd produced by the conventional method in color and luster, odor, taste and flavor when eaten.

When comparative analysis was performed on the functional soybean curd produced above and the fine-grained soybean curd produced by the conventional method, the functional soybean curd contains large quantity of food fibers, insoluble pectin, lecithin, and soluble pectin as not contained in the conventional type fine-grained soybean curd. Also, it was found that the functional soybean curd contains large quantity of glucides and oligosaccharides.

EXAMPLE 6a

First, 1 kg of raw material soybeans was immersed in 2,500 ml of water for 13 hours.

Then, 2,200 ml of cold water was added, and the mixture was mechanically smashed. It was then heated at 105° C. for 5 minutes, and solid-liquid separation was performed, and 4,500 ml of soybean milk and 1.2 kg of soybean curd lees were produced.

The soybean curd lees thus produced were placed in a bio-reactor (enzyme reactor), and 1,800 ml of water was added, and temperature was adjusted to 50° C. Then, 6 g of "Macerozyme A", 9 g of "Cellulase A Amano" and 4 g of "Uniase BM-8" were added, and a mixed suspension slurry was produced.

This mixed suspension slurry was placed into a bio-reactor provided with mechanical pulverizer. Keeping the temperature at 50° C., enzyme reaction by the above enzymes and mechanical pulverizing force were applied (primary enzyme reaction). The suspension slurry was agitated and circulated between the bio-reactor and the mechanical pulverizer for 40 minutes, and 3,000 ml of functional soybean curd lees milk (Brix 7, pH 6.7) was produced. Next, to the functional soybean curd lees milk thus produced, 4,500 ml of the above soybean milk (Brix 13; pH 6.7) was added. Then, 40 g of "Activa TG-M" and 150 g of "Trehaose" (trade name; a high purity water-containing trehalose produced by Hayashibara Biochemical Laboratories, Inc.) (a non-reducing type glucide preparation bonded with two molecules of glucose at $\alpha$ and $\alpha$–1) were added and mixed. "Trehaose" is known to have the function to promote stability of protein and to give better taste and flavor. Enzyme reaction (secondary enzyme reaction) was performed at 50° C. for 10 minutes, and 7,500 ml of functional total soybean curd lees milk (Brix 10; pH 6.7) using total tissues of soybeans was produced.

This was separated from the bio-reactor and was filtered through a 100-mesh vibratory screen to remove hypocotyls and this was heated at 85° C. to sterilize and deactivate the enzymes. Then, 20 g of "Pearl" and 5 g of "glucono-delta-lactone" were dissolved in a small quantity of water, and this solution was quickly added and mixed. Then, the mixture was sealed in a container and was cooled down. As a result, 25 pieces of functional soybean curds (the whole soybean curds) using total tissues of soybeans were produced (300 g/piece). The results of the paneler test on the functional soybean curd (whole soybean curd) are summarized in Table 3a. The results of the analysis on the components of the functional soybean curd are compared with the fine-grained soybean curds produced by the conventional method in Table 4a.

As it is evident from these tables, the functional soybean curd produced according to the present invention showed the results within the range of "moderate" to "good" in all items of evaluation including color and luster, odor, taste, and flavor when eaten. It was also found that the functional soybean curd of the present invention contains food fibers, insoluble pectin, and soluble pectin, which are not contained in the fine-grain soybean curd produced by the conventional method, and also that it contains large quantity of glucides and oligosaccharides.

TABLE 3a

| Item evaluation | Good | Moderate | No good | Comments |
| --- | --- | --- | --- | --- |
| Color and luster | 2 | 8 | 0 | Opaque and lustrous |
| Odor | 3 | 7 | 0 | Faint odor of soybeans |
| Taste | 3 | 7 | 0 | Sweet and has good body |
| Flavor when eaten | 2 | 8 | 0 | Palpable and tasty |
| Total | 10 | 30 | 0 | Tasty and in good repute |

TABLE 4a

| Item of analysis | Functional soybean curd | Fine-grained soybean curd | Remarks |
| --- | --- | --- | --- |
| Food fibers | 1,700 | 0 | |
| Insoluble pectin | 600 | 0 | |
| Soluble pectin | 600 | 0 | |
| Glucides | 5,500 | 1,700 | |
| Raffinose | 140 | 110 | Oligosaccharides |
| Stachyose | 870 | 630 | Oligosaccharides |

Unit: mg/100 g

EXAMPLE 7a

First, 1 kg of raw material soybeans was immersed in 2,500 ml of water for 13 hours.

Then, 1,500 ml of cold water was added, and the mixture was mechanically smashed. It was then heated at 105° C. for 5 minutes to produce boiled "go". This boiled "go" was placed into a bio-reactor (enzyme reactor), and temperature was adjusted to 50 ° C. Then, 12 g of "Macerozyme A", 13 g of "Cellulase Onozuka 3S", and 4 g "Uniase BM-8" were added, and a mixed suspension slurry was produced.

This mixed suspension slurry was placed into a bio-reactor provided with mechanical pulverizer. Keeping the temperature at 50° C., enzyme reaction by the above enzymes and mechanical pulverizing force were applied (primary enzyme reaction). The suspension slurry was agitated and circulated between the bio-reactor and the mechanical pulverizer for 40 minutes, and 5,000 ml of boiled "go" (Brix 15; pH 6.8) was produced.

Next, to the boiled "go" thus obtained, 2,500 ml of water and 40 g of "Activa TG-M" were added and mixed. Enzyme reaction (secondary enzyme reaction) was performed at 50° C. for 10 minutes, and 7,500 ml of functional total soybean curd lees milk (Brix 10; pH 6.8) using total tissues of soybeans was produced.

The functional total soybean curd lees milk was separated from the bio-reactor, and this was processed by a 100-mesh centrifuge to remove hypocotyls. Then, 24 g of "glucono-delta-lactone" was dissolved in small quantity of water, and this solution was added and mixed. Then, the mixture was placed into a packing container and was heated and coagulated at 85° C. for 40 minutes and was then quickly cooled down. Thus, 25 pieces of functional new soybean curd (hereinafter referred as "whole soybean curd") using total tissues of soybeans were produced (300 g/piece).

EXAMPLE 8a

First, 1 kg of raw material soybeans was immersed in 2,500 ml of water for 13 hours.

Then, 1,500 ml of cold water was added, and the mixture was mechanically smashed. It was then heated at 105° C. for 5 minutes to produce boiled "go". This boiled "go" was placed into a bio-reactor (enzyme reactor), and temperature was adjusted to 50° C. Then, 12 g of "Macerozyme A", 13 g of "Cellulase Onozuka 3S", and 4 g of "Uniase BM-8" were added and mixed, and a mixed suspension slurry was produced.

The mixed suspension slurry was placed into a bio-reactor provided with mechanical pulverizer. Keeping the temperature at 50° C., enzyme reaction by the above enzymes and mechanical pulverizing force were applied (primary enzyme reaction). The mixed suspension slurry was agitated and circulated between the bio-reactor and the mechanical pulverizer for 40 minutes, and 5,000 ml boiled "go" (Brix 15; pH 6.8) was produced.

Next, to the boiled "go" thus obtained, 2,500 ml of water, and 40 g of "Activa TG-M", and 150 g of "Trehaose" (trade name; a high purity water-containing trehalose preparation; produced by Hayashibara Biochemical Laboratories, Inc.) were added and mixed. Enzyme reaction (secondary enzyme reaction) was performed at 50° C. for 10 minutes, and 7,500 ml of functional total soybean curd lees milk (Brix 10; pH 6.8) using total tissues of soybeans was produced.

This functional total soybean curd lees milk was separated from the bio-reactor, and this was processed by a 100-mesh centrifuge to remove hypocotyls. Then, 24 g of "glucono-delta-lactone" was dissolved into small quantity of water, and this solution was added and mixed. Then, the mixture was placed in a packing container and was heated and coagulated at 85° C. for 40 minutes and was quickly cooled down. Thus, 25 pieces of functional soybean curds (300 g/piece) using total tissues of soybeans were produced.

On the soybean curds obtained in the Examples 6a–8a, the paneler test and the analysis were performed by the same procedure as given in Table 1a and Table 2a. The results equal to or more favorable than the results of Example 5a were obtained.

EXAMPLE 9a

First, 1.2 kg of raw material soybeans was roughly crushed, wind-assorted and pressurized, and 1 kg of shelled soybeans was obtained. This was immersed in 2,200 ml of water for 30 minutes.

Then, 2,500 ml of cold water was added, and the mixture was mechanically smashed. It was then heated at 105° C. for 5 minutes and solid-liquid separation was performed, and 4,600 ml of soybean milk and 1.1 kg of soybean curd lees were produced.

The soybean curd lees thus obtained were placed into a bio-reactor (enzyme reactor) with mechanical pulverizer, and 2,400 ml of lukewarm water was added. Temperature was adjusted to 35° C. Then, 8 g of "Macerozyme A" to disintegrate vegetable tissues of soybeans, 10 g of "Cellulase Onozuka 3S", and 8 g of "Uniase BM-8" were added.

Enzyme reaction by the above enzymes and mechanical pulverizing force were applied on the mixture. Then, the mixture was agitated and circulated between the bio-reactor and the mechanical pulverizer for 30 minutes, and 3,500 ml of functional soybean curd lees milk (Brix 7; pH 6.7) was produced.

Next, to the functional soybean curd lees milk thus obtained, 4,600 ml of soybean milk (Brix 13; pH 6.7) and 160 g of "Trehaose" were added, and 8,100 ml of functional total soybean curd lees milk (Brix 10; pH 6.7) was produced.

The functional total soybean curd lees milk and soybean milk A were separated from the bio-reactor. Then, 25 g of "glucono-delta-lactone" was dissolved into small quantity of water, and this solution was added and mixed. Then, the mixture was placed in a packing container and was heated and coagulated at 85° C. for 40 minutes and was quickly cooled down. Thus, 27 pieces of functional soybean curds using most of the soybean tissues were produced (300 g/piece).

The functional total soybean curd lees milk or the functional soybean curd produced according to the present invention as described above uses total components of soybeans as raw material, and this may be called "whole healthy soybean milk" or "whole healthy soybean curd". In addition to large quantity of food fibers, it contains vegetable protein, linoleic acid, lecithin, isoflavone glycoside, saponin, calcium, iron, potassium and other mineral components.

In particular, the processing by plant cell wall decomposing enzyme cuts off food fibers of soybeans and turn it to low molecular components and promotes the functions of the product. The food fibers which have been turned to low molecular components are useful to reduce blood pressure and to decrease cholesterol level. Further, it is known that, when food fibers pass through digestive tract, these fibers exert various actions to the digestive tract and the contents of the tract, i.e, the actions to activate the functions of digestive tract, to increase the volume of feces and to quickly discharge spodogenous substances to outside, to decrease digestive absorption of dietary components, to decrease intestinal and enteral pressure, etc.

Oligosaccharides having the same high function as low molecular food fibers are also contained in the functional soybean curd lees milk and the functional soybean curd. Stachyose, raffinose, etc. helpful to proliferate bifidus bacteria, which are beneficial enteral bacteria, are also contained and give the effect to prevent aging. These effects promote the value of soybean milk and soybean curd as healthy products, while mild sweetness of oligosaccharides enhances tastiness of these products.

In the past, food fibers have been believed as unnecessary refuse because of the difficulty to digest, and soybean milk has been marketed after reducing or removing food fibers from it. At present, however, the importance of food fibers have been recognized again. The functional soybean milk according to the present invention contains less quantity of artificial food additives, and total soybean tissues are utilized as natural food. As a result, it is not necessary to discard soybean curd lees as undesirable side product. This eliminates environmental problems such as waste disposal. Further, soybean curd lees can be utilized for the whole soybean milk and soybean curd and can be used as valuable resources. When the present invention is carried out, total quantity of soybean curd lees can be utilized as food product, and the burden of waste disposal can be eliminated. This will provide great advantages to the food industry.

The enzymes used in the present invention such as pectinase, hemicellulase, cellulase or amylase are the enzymes to decompose plant tissues of components of soybeans, and the quantity to add these enzymes is preferably 0.1–1.0 weight %. Reaction temperature is preferably 20° C.–60° C., and reaction time is preferably 30–90 minutes. Mechanical pulverizing force by the pulverizer such as colloid mill will provide cumulative effect when it is associated with agitation and circulation of the product, and this makes it possible to perform enzyme reaction at high efficiency.

According to the present invention, protein stability and protein crosslinking in the functional total soybean curd lees milk and the functional soybean curd are useful to promote visco-elasticity and taste and flavor when eaten. It is preferable to add transglutaminase to promote enzyme reaction and to add trehalose as non-reducing glucide. It is preferable to add trehalose in an amount of 1–5 weight %, and transglutaminase in an amount of 0.1–2.0 weight %. It is also preferable that reaction temperature is 20° C.–50° C., and reaction time is 70–10 minutes. By agitating and circulating the product in the bio-reactor, it is possible to give better taste, palpability and flavor of the product.

INDUSTRIAL APPLICABILITY

According to the present invention, total tissues of soybeans can be utilized as raw material, and this makes it possible to overcome environmental problem. Also, production cost to produce soybean milk and soybean curd can be extensively reduced because soybean curd lees are not discharged almost at all as side product.

In the past, food fibers has been regarded as unnecessary refuse because of the difficulty to digest, and it has been practiced to remove food fibers when producing the soybean milk for commercial marketing. Today, the importance of food fibers is recognized again, and the soybean milk and the soybean curd containing large percentage of food fibers according to the present invention will contribute very much to the healthy life of the consumers in the form of functional soybean curd lees milk or the functional soybean curd.

In particular, the functional soybean curd lees milk is produced by simultaneous use of plant tissue disintegrating enzyme and protein crosslinking enzyme, and it is tasty and palpable and gives good flavor when eaten. The consumers do not feel that soybean curd lees are contained in it, and it is a superb food, which contains large quantity of food fibers, soybean oligosaccharides, etc.

What is claimed is:

1. A method for producing a functional soybean curd lees milk, comprising the steps of:
   adding water and a plant tissue disintegrating enzyme to soybean curd lees produced in a process to produce soybean products,
   performing enzyme reaction while applying mechanical pulverizing process in a liquid to miniaturize a size of the soybean curd lees to particles,
   performing enzyme reaction by adding protein crosslinking enzyme to bind the particles together, and
   producing functional soybean curd lees milk containing food fibers.

2. A method for producing a functional soybean curd lees milk, comprising the steps of:
   adding water, a plant tissue disintegrating enzyme, and a protein decomposing enzyme to soybean curd lees formed in a process to produce soybean-related food products,
   performing enzyme reaction by adding mechanical pulverizing process in the liquid to miniaturize a size of the soybean curd lees to particles,
   performing enzyme reaction by adding a protein crosslinking enzyme to bind the particles together, and
   producing a functional soybean curd lees milk containing food fibers.

3. A method for producing a functional soybean curd lees milk, comprising the steps of:
   adding water and a plant tissue disintegrating enzyme to soybean curd lees produced in a process to produce soybean products,
   performing enzyme reaction while applying mechanical pulverizing process in a liquid to miniaturize a size of the soybean curd lees to particles,
   performing enzyme reaction by adding soybean milk formed in a process to produce the soybean-related food products and mixing with a protein crosslinking enzyme to bind the particles of the soybean curd lees and soybean milk together, and
   producing a functional total soybean curd lees milk containing food fibers.

4. A method for producing a functional soybean curd lees milk, comprising the steps of:
   adding water and a plant tissue disintegrating enzyme to soybean curd lees produced in a process to produce soybean products,
   performing enzyme reaction while applying mechanical pulverizing process in a liquid to miniaturize a size of the soybean curd lees to particles,
   performing enzyme reaction by adding a protein crosslinking enzyme to bind the particles together,
   adding and mixing soybean milk formed in the process to produce said soybean-related food product, and
   producing a functional total soybean curd lees milk containing food fibers.

5. A method for producing a functional soybean curd lees milk, comprising the steps of:
   performing water-immersion process, smashing process and heating process on soybeans one after another to obtain a boiled water-immersed and smashed soybeans, and performing enzyme reactions according to claim 1 to said boiled water-immersed and smashed soybeans.

6. A method for producing a functional soybean curd less milk according to claim 1, wherein
   adding quantity of the plant tissue disintegrating enzyme is 0.1–1.0 weight %, reaction temperature is 20° C.–60° C., and reaction time is 30–90 minutes; and
   adding quantity of the protein crosslinking enzyme is 0.1–2.0 weight %, enzyme reaction temperature is 20° C.–50° C., and enzyme reaction time is 70–10 minutes.

7. A method for producing a functional soybean curd lees milk according to claim 1, wherein the soybean curd lees are pulverized to a particle size of less than 100 μm by the mechanical pulverizing process.

8. A method for producing a functional soybean curd lees milk according to claim 1, wherein the protein crosslinking enzyme is transglutaminase.

9. A method for producing a functional soybean curd lees milk according to claim 1, wherein the plant tissue disintegrating enzyme is an enzyme to decompose and dissolve pectin, protopectin, hemicellulose or cellulose to low molecular substances.

10. A method for producing a functional soybean curd, comprising the steps of:
    adding water and a plant tissue disintegrating enzyme to soybean curd lees produced in a process to produce soybean products,
    performing enzyme reaction while applying mechanical pulverizing process in liquid to miniaturize a size of the soybean curd lees to particles,
    adding a protein crosslinking enzyme and the soybean milk formed in the process to produce the soybean products and mixing together to obtain a functional total soybean curd lees milk by performing enzyme reaction, and
    producing a functional soybean curd by adding a coagulant to and mixing with said soybean curd lees milk.

11. A method for producing a functional soybean curd, comprising the steps of:
   adding water and a plant tissue disintegrating enzyme to soybean curd lees produced in a process to produce soybean products,
   performing enzyme reaction while applying mechanical pulverizing process in a liquid to miniaturize a size of the soybean curd lees to particles,
   performing enzyme reaction by adding a protein crosslinking enzyme to obtain a functional total soybean curd lees milk by adding and mixing soybean milk obtained in the process to produce the soybean products, and
   producing a functional soybean curd by adding and mixing a coagulant to the soybean curd lees milk.

12. A method for producing a functional soybean curd according to claim 10, wherein mechanical pulverizing process is performed during enzyme reaction by the protein crosslinking enzyme.

13. A method for producing a functional soybean curd, comprising the steps of:
   performing water-immersion process, smashing process and heating process to soybeans one after another to produce a boiled water-immersed and smashed soybean, and performing enzyme reactions described in claim 10 to said boiled water-immersed and smashed soybean.

14. A method for producing a functional soybean curd according to claim 10, wherein
   adding quantity of the plant tissue disintegrating enzyme is 0.1–1.0 weight %, reaction temperature is 20° C.–60° C., and reaction time is 30–90 minutes; and
   adding quantity of the protein crosslinking enzyme is 0.1–2.0 weight %, enzyme reaction temperature is 20° C.–50° C., and enzyme reaction time is 70–10 minutes.

15. A method for producing a functional soybean curd according to claim 10, wherein the mechanical pulverizing process is to pulverize the soybean curd lees to a particle size of less than 100 $\mu$m.

16. A method for producing a functional soybean curd according to claim 15, wherein the mechanical pulverizing process is performed using a colloid mill.

17. A method for producing a functional soybean curd according to claim 10, wherein the protein crosslinking enzyme is transglutaminase.

18. A method for producing a functional soybean curd according to claim 10, wherein the plant tissue disintegrating enzyme is an enzyme to decompose and dissolve pectin, hemicellulose or cellulose to low molecular substances.

19. A method for producing a functional soybean curd according to claim 1, wherein said soybean curd lees are substantially decomposed to the particles to have a size less than 100 $\mu$m by the enzyme reaction and pulverizing process.

20. A method for producing a functional soybean curd according to claim 2, wherein said soybean curd lees are substantially decomposed to the particles to have a size less than 100 $\mu$m by the enzyme reaction and pulverizing process.

21. A method for producing a functional soybean curd according to claim 3, wherein said soybean curd lees are substantially decomposed to the particles to have a size less than 100 $\mu$m by the enzyme reaction and pulverizing process.

22. A method for producing a functional soybean curd according to claim 4, wherein said soybean curd lees are substantially decomposed to the particles to have a size less than 100 $\mu$m by the enzyme reaction and pulverizing process.

* * * * *